(12) United States Patent
Kim et al.

(10) Patent No.: US 11,840,147 B2
(45) Date of Patent: Dec. 12, 2023

(54) SYSTEM AND METHOD IN DATA-DRIVEN VEHICLE DYNAMIC MODELING FOR PATH-PLANNING AND CONTROL

(71) Applicant: Canoo Technologies Inc., Torrance, CA (US)

(72) Inventors: Kilsoo Kim, Hermosa Beach, CA (US); Aviral Singh, Torrance, CA (US); David R. Arft, Torrance, CA (US)

(73) Assignee: Canoo Technologies Inc., Torrance, CA (US)

( * ) Notice: Subject to any disclaimer, the term of this patent is extended or adjusted under 35 U.S.C. 154(b) by 0 days.

(21) Appl. No.: 17/305,702

(22) Filed: Jul. 13, 2021

(65) Prior Publication Data
US 2023/0021802 A1 Jan. 26, 2023

(51) Int. Cl.
| | |
|---|---|
| *B60L 15/20* | (2006.01) |
| *B60L 3/10* | (2006.01) |
| *B60R 16/023* | (2006.01) |
| *H04L 12/40* | (2006.01) |

(52) U.S. Cl.
CPC ........... *B60L 15/2036* (2013.01); *B60L 3/108* (2013.01); *B60R 16/0232* (2013.01); *H04L 12/40* (2013.01); *B60L 2240/18* (2013.01); *B60L 2240/22* (2013.01); *B60L 2240/24* (2013.01); *B60L 2240/46* (2013.01);
(Continued)

(58) Field of Classification Search
CPC .. B60L 15/2036; B60L 3/108; B60L 2240/18; B60L 2240/22; B60L 2240/24; B60L 2240/46; B60R 16/0232; B60Y 2200/91
See application file for complete search history.

(56) References Cited

U.S. PATENT DOCUMENTS

| | | |
|---|---|---|
| 6,675,094 B2 | 1/2004 | Russell et al. |
| 9,352,778 B2 | 5/2016 | Yoon et al. |
| 9,595,197 B2 | 3/2017 | Lee |

(Continued)

FOREIGN PATENT DOCUMENTS

| | | |
|---|---|---|
| CN | 109740469 A | 5/2019 |
| CN | 111344646 A | 6/2020 |

(Continued)

OTHER PUBLICATIONS

English translation of Kusumoto et al. (JP2018203173A). (Year: 2018).*

(Continued)

*Primary Examiner* — James M McPherson
*Assistant Examiner* — Kyle J Kingsland

(57) ABSTRACT

Operation and motion control, by a vehicle's ADAS or AD features, is improved in ways suitable to EVs having higher driving and handling performance. The vehicle dynamic model for high rates of lateral acceleration (e.g., sharp cornering or taking curves having a small radius of curvature as faster speeds) is improved by one or more of optimizing time cornering stiffness with a sigmoid function and/or altering front/rear steering angle to account for roll steer and compliance steer, based on vehicle testing. Indicators for lane departure warning or collision warning, evasive steering, or emergency braking are therefore reliably extended to allow higher performance maneuvers.

20 Claims, 15 Drawing Sheets

(52) U.S. Cl.
CPC . *B60Y 2200/91* (2013.01); *H04L 2012/40215* (2013.01); *H04L 2012/40273* (2013.01)

(56) References Cited

U.S. PATENT DOCUMENTS

| | | | |
|---|---|---|---|
| 10,227,039 | B1 | 3/2019 | Prasad |
| 11,104,336 | B2 | 8/2021 | Lin et al. |
| 11,237,562 | B2 | 2/2022 | Schultz et al. |
| 11,260,757 | B2 | 3/2022 | Degand et al. |
| 11,328,593 | B2 | 5/2022 | Urano et al. |
| 11,535,274 | B2 | 12/2022 | Dingli et al. |
| 2003/0229438 | A1* | 12/2003 | Hac ............... B60T 8/1755 701/1 |
| 2004/0164851 | A1 | 8/2004 | Crawshaw |
| 2008/0071451 | A1* | 3/2008 | Yamaguchi ......... B60W 10/08 701/69 |
| 2009/0021358 | A1 | 1/2009 | Lee et al. |
| 2009/0030613 | A1 | 1/2009 | Kataoka et al. |
| 2009/0037062 | A1 | 2/2009 | Lee et al. |
| 2009/0157263 | A1 | 6/2009 | Shin |
| 2009/0284360 | A1 | 11/2009 | Litkouhi |
| 2010/0172542 | A1 | 7/2010 | Stein et al. |
| 2010/0182139 | A1 | 7/2010 | Chen et al. |
| 2012/0022739 | A1 | 1/2012 | Zeng |
| 2012/0050074 | A1 | 3/2012 | Bechtel et al. |
| 2013/0190982 | A1 | 7/2013 | Nakano et al. |
| 2013/0190985 | A1 | 7/2013 | Nakano et al. |
| 2013/0261898 | A1 | 10/2013 | Fujita et al. |
| 2013/0321172 | A1 | 12/2013 | Igarashi et al. |
| 2013/0335213 | A1 | 12/2013 | Sherony et al. |
| 2013/0345900 | A1 | 12/2013 | Usui |
| 2014/0002655 | A1 | 1/2014 | Woo et al. |
| 2014/0236428 | A1 | 8/2014 | Akiyama |
| 2015/0149037 | A1 | 5/2015 | Lim et al. |
| 2015/0314783 | A1 | 11/2015 | Nespolo et al. |
| 2017/0010618 | A1 | 1/2017 | Shashua et al. |
| 2017/0313253 | A1 | 11/2017 | Hughes et al. |
| 2018/0024238 | A1 | 1/2018 | Khlifi |
| 2018/0024562 | A1 | 1/2018 | Bellaiche |
| 2018/0025235 | A1 | 1/2018 | Fridman |
| 2018/0141528 | A1 | 5/2018 | Oh et al. |
| 2018/0150700 | A1 | 5/2018 | Kaneko et al. |
| 2018/0186378 | A1 | 7/2018 | Zhuang et al. |
| 2018/0237007 | A1 | 8/2018 | Adam et al. |
| 2018/0307236 | A1 | 10/2018 | Reed |
| 2019/0072973 | A1 | 3/2019 | Sun et al. |
| 2019/0202453 | A1 | 7/2019 | Farooqi et al. |
| 2019/0283748 | A1 | 9/2019 | Hajika et al. |
| 2019/0384294 | A1 | 12/2019 | Shashua et al. |
| 2019/0389470 | A1 | 12/2019 | Zarringhalam et al. |
| 2020/0079372 | A1 | 3/2020 | Hajika |
| 2020/0272835 | A1 | 8/2020 | Cheng et al. |
| 2020/0339079 | A1 | 10/2020 | Ohmura |
| 2020/0377088 | A1 | 12/2020 | Fukushige et al. |
| 2020/0379461 | A1 | 12/2020 | Singh et al. |
| 2021/0171042 | A1 | 6/2021 | Hayakawa et al. |
| 2021/0197858 | A1 | 7/2021 | Zhang et al. |
| 2021/0221364 | A1 | 7/2021 | Mase et al. |
| 2021/0229708 | A1 | 7/2021 | Kondo et al. |
| 2021/0366144 | A1 | 11/2021 | Magistri et al. |
| 2022/0082403 | A1 | 3/2022 | Shapira et al. |
| 2022/0089219 | A1 | 3/2022 | Takebayashi et al. |
| 2022/0097697 | A1 | 3/2022 | Wang et al. |
| 2022/0212670 | A1 | 7/2022 | Aoki et al. |
| 2022/0266852 | A1 | 8/2022 | Khayyer |
| 2022/0363250 | A1 | 11/2022 | Varunjikar et al. |

FOREIGN PATENT DOCUMENTS

| | | |
|---|---|---|
| CN | 109740469 B | 1/2021 |
| DE | 10333670 B4 | 7/2019 |
| EP | 3342666 A1 | 7/2018 |
| EP | 3805073 A1 | 4/2021 |
| GB | 2550256 A | 11/2017 |
| IN | 202014005110 A | 8/2020 |
| JP | 2009-020854 A | 1/2009 |
| JP | 5187171 B2 | 4/2013 |
| JP | 2018203173 A * | 12/2018 |
| JP | 2021-503414 A | 2/2021 |
| WO | 2019099622 A1 | 5/2019 |

OTHER PUBLICATIONS

Camila Leao Pereira et al., "Cornering stiffness estimation using Levenberg-Marquardt approach", May 4, 2021, Inverse Problems in Science and Engineering, vol. 29 2021, Issue 12, pp. 2207-2238. (Year: 2021).*

C. Sierra et al., "Cornering stiffness estimation based on vehicle later dynamics", 2006, Vehicle System Dynamics, vol. 44, pp. 24-38. (Year: 2006).*

Y.F. Lian et al. "Cornering Stiffness and Sideslip Angle Estimation Based on Simplified Lateral Dynamic Models for Four-In-Wheel-Motor-Driven Electric Vehicles With Lateral Tire Force Information", 2015, International Journal of automotive technology, vol. 16 No. 4, pp. 669-683. (Year: 2015).*

Bouhoute, Afaf, et al., "On the Application of Machine Learning for Cut-In Maneuver Recognition in Platooning Scenarios", 2020 IEEE 91st Vehicular Technology Conference (VTC2020-Spring), 2020, 5 pages.

Heinemann, Tonja, "Predicting Cut-Ins in Traffic Using a Neural Network", Master's thesis in Systems, Control and Mechatronics, Chalmers University of Technology, Department of Electrical Engineering, Gothenburg, Sweden, 2017, 62 pages.

Bar Hillel, Aharon, et al., "Recent Progress in Road and Lane Detection: A Survery", Machine Vision and Applications, Apr. 2014, 20 pages.

Morris, Brendan, et al., "Lane Change Intent Prediction for Driver Assistance: On-Road Design and Evaluation", 2011 IEEE Intelligent Vehicles Symposium (IV), Baden-Baden, Germany, Jun. 5-9, 2011, 8 pages.

Narote, S.P., et al., "A Review of Recent Advances in Lane Detection and Departure Warning System", Pattern Recognition, vol. 73, Jan. 2018, 50 pages.

Non-Final Office Action dated Jan. 18, 2023, in connection with U.S. Appl. No. 17/305,701, 9 pages.

International Search Report and Written Opinion of the International Search Authority dated Sep. 30, 2022, in connection with International Application No. PCT/US2022/037008, 7 pages.

International Search Report and Written Opinion of the International Search Authority dated Nov. 16, 2022, in connection with International Application No. PCT/US2022/037000, 8 pages.

International Search Report and Written Opinion of the International Search Authority dated Nov. 15, 2022, in connection with International Application No. PCT/US2022/037011, 8 pages.

International Search Report and Written Opinion of the International Search Authority dated Nov. 18, 2022, in connection with International Application No. PCT/US2022/037013, 9 pages.

International Search Report and Written Opinion of the International Search Authority dated Nov. 18, 2022, in connection with International Application No. PCT/US2022/037015, 8 pages.

International Search Report and Written Opinion of the International Search Authority dated Nov. 15, 2022, in connection with International Application No. PCT/US2022/037016, 9 pages.

Baek, et al., "Practical Approach for Developing Lateral Motion Control of Autonomous Lane Change System," Applied Sciences 2020, 10, 3143, Apr. 2020, 15 pages.

Weon, et al., "Lane Departure Detecting with Classification of Roadway Based on Bezier Curve Fitting Using DGPS/GIS," Technical Gazette 28 1(2021), Feb. 2021, 8 pages.

Non-Final Office Action dated Mar. 28, 2023, in connection with U.S. Appl. No. 17/305,704, 14 pages.

Non-Final Office Action dated Mar. 30, 2023, in connection with U.S. Appl. No. 17/305,706, 12 pages.

Non-Final Office Action dated Apr. 25, 2023, in connection with U.S. Appl. No. 17/305,703, 17 pages.

Final Office Action dated Jun. 23, 2023, in connection with U.S. Appl. No. 17/305,701, 13 pages.

(56) References Cited

OTHER PUBLICATIONS

Non-final Office Action dated Jun. 30, 2023, in connection with U.S. Appl. No. 17/305,705, 12 pages.
Notice of Allowance dated Aug. 7, 2023, in connection with U.S. Appl. No. 17/305,706, 6 pages.
Non-final Office Action dated Aug. 24, 2023, in connection with U.S. Appl. No. 17/305,701, 12 pages.
Final Office Action dated Sep. 8, 2023, in connection with U.S. Appl. No. 17/305,704, 15 pages.
Notice of Allowance dated Oct. 18, 2023, in connection with U.S. Appl. No. 17/305,703, 11 pages.
Notice of Allowance dated Oct. 18, 2023, in connection with U.S. Appl. No. 17/305,705, 11 pages.

* cited by examiner

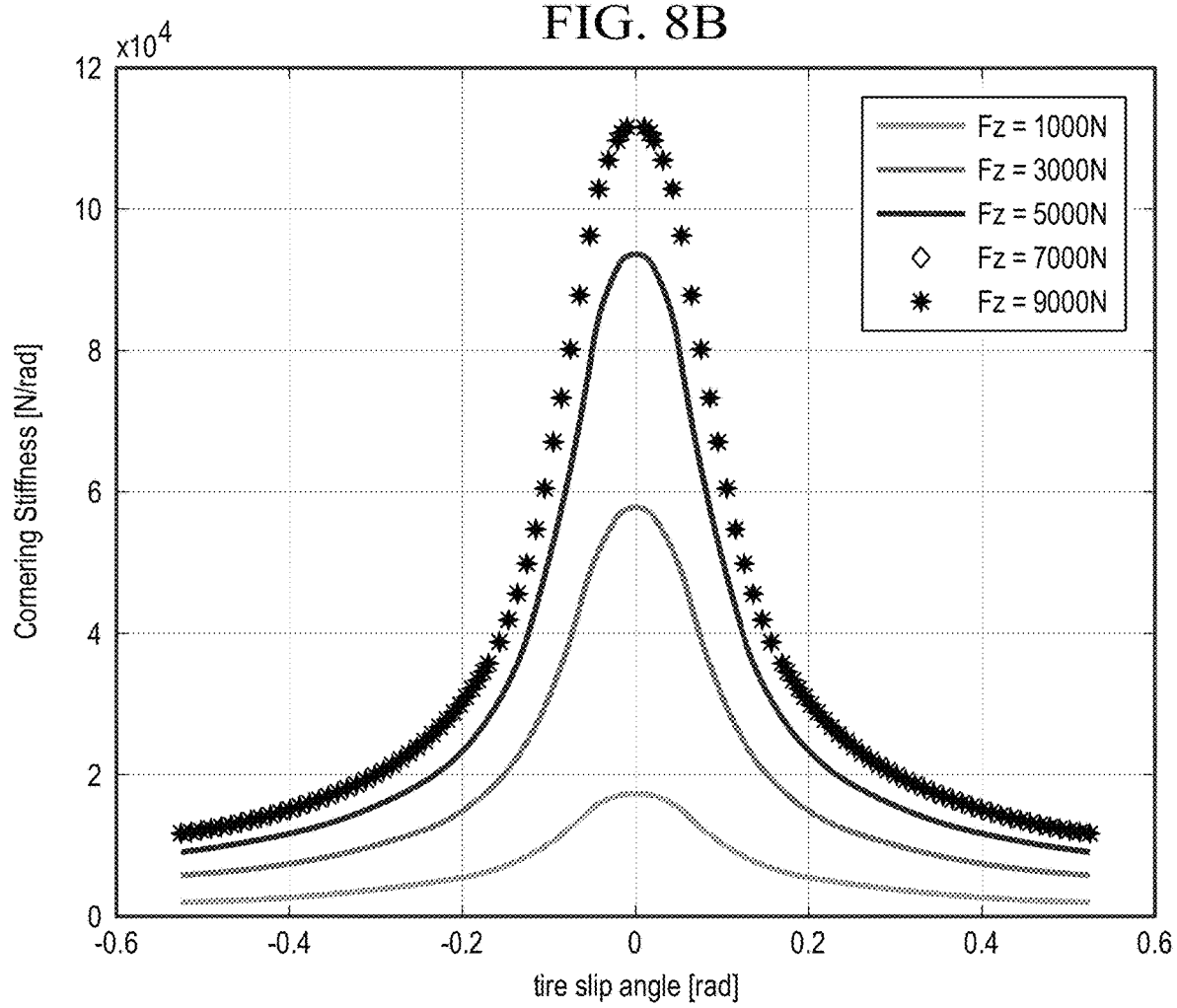

SYSTEM AND METHOD IN DATA-DRIVEN VEHICLE DYNAMIC MODELING FOR PATH-PLANNING AND CONTROL

CROSS-REFERENCE TO RELATED APPLICATIONS

This application is related to the subject matter of: U.S. Patent Application Ser. No. 17/305,701 filed Jul. 13, 2021 and entitled SYSTEM AND METHOD IN THE PREDICTION OF TARGET VEHICLE BEHAVIOR BASED ON IMAGE FRAME AND NORMALIZATION; U.S. Patent Application Ser. No. 17/305,703 filed Jul. 13, 2021 and entitled SYSTEM AND METHODS OF INTEGRATING VEHICLE KINEMATICS AND DYNAMICS FOR LATERAL CONTROL FEATURE AT AUTONOMOUS DRIVING; U.S. Patent Application Ser. No. 17/305,704 filed Jul. 13, 2021 and entitled SYSTEM AND METHOD IN VEHICLE PATH PREDICTION BASED ON IMAGE FRAME WITH FULL NONLINEAR KINEMATICS; U.S. Patent Application Ser. No. 17/305,705 filed Jul. 13, 2021 and entitled SYSTEM AND METHOD IN LANE DEPARTURE WARNING WITH FULL NONLINEAR KINEMATICS AND CURVATURE; U.S. Patent Application Ser. No. 17/305,706 filed Jul. 13, 2021 and entitled SYSTEM AND METHOD IN LANE DEPARTURE WARNING WITH EGO MOTION PREDICTION AND VISION. The content of the above-identified patent documents is incorporated herein by reference.

TECHNICAL FIELD

This disclosure relates generally to vehicle driver assist or autonomous driving systems. More specifically, this disclosure relates to vehicle operation and motion control.

BACKGROUND

Advanced driving assist system (ADAS) features, which use automated technology to assist the vehicle operator in driving and parking, form a foundation for autonomous driving (AD). Determination of vehicle position information and/or detection of nearby objects enables features such as: collision detection and avoidance for adaptive cruise control (ACC), emergency braking; blind spot detection for collision warning and/or evasive steering; lane detection for lane keeping and/or centering, lane changing, or lane departure warning; and path planning and control. Other ADAS and AD features may also be implemented using the same sensor set(s).

Electric vehicles (EVs) are often capable of higher driving and handling performance relative to conventional vehicles. EV designs can include low centers of gravity, independent steering, and immediate, quick, and smooth acceleration. As a result, ADAS and AD features for EVs can involve different considerations than those for conventional vehicles.

SUMMARY

Operation and motion control, by a vehicle's ADAS or AD features, is improved in ways suitable to EVs having higher driving and handling performance. The vehicle dynamic model for high rates of lateral acceleration (e.g., sharp cornering or taking curves having a small radius of curvature as faster speeds) is improved by one or more of optimizing time cornering stiffness with a sigmoid function and/or altering front/rear steering angle to account for roll steer and compliance steer, based on vehicle testing. Indicators for lane departure warning or collision warning, evasive steering, or emergency braking are therefore reliably extended to allow higher performance maneuvers.

In some embodiments, the cornering stiffness may be adapted by a sigmoid function of lateral acceleration of the vehicle. The cornering stiffness may be determined from:

$$\left\{ \begin{matrix} \dot{\beta} \\ \dot{r} \end{matrix} \right\} \begin{bmatrix} \frac{-2}{mV_x}(C_f + C_r) & -1 + \frac{2(-l_f C_f + l_r C_r)}{mV_x^2} \\ \frac{2}{I_z}(-l_f C_f + l_r C_r) & \frac{-2}{I_z V_x}(l_f^2 C_f + l_r^2 C_r) \end{bmatrix}$$

$$\left\{ \begin{matrix} \beta \\ r \end{matrix} \right\} + \begin{bmatrix} 2\frac{C_f}{mV_x} & 2\frac{C_r}{mV_x} \\ 2\frac{l_f C_f}{I_z} & -2\frac{l_r C_r}{I_z} \end{bmatrix} \begin{bmatrix} 1 & k_f \\ 0 & k_r \end{bmatrix} \left\{ \begin{matrix} \delta_f \\ A_y \end{matrix} \right\},$$

where $A_y$ is the lateral acceleration of the vehicle, $C_f$ and $C_r$ are front and rear cornering stiffness, respectively, $\beta$ is side-slip angle of the vehicle and $\dot{\beta}$ is the derivative of $\beta$ with respect to time, r is velocity of the vehicle in a yaw direction and $\dot{r}$ is the derivative of r with respect to time, $V_x$ is the longitudinal component of the vehicle's velocity V, $l_f$ and $l_r$ are front and rear wheelbase length for the vehicle, m and $l_z$ are translational and rotational mass inertia for the vehicle, respectively, and $k_f$ and $k_r$ are optimization parameters determined by testing of the vehicle. The front steering angle and the rear steering angle may each include a term accounting for roll steering and compliance steering. The front steering angle $\delta_f$ may be given by $$\delta_f = \delta_{f,kinematic} + k_f a_y,$$

where $\delta_{f,kinematic}$ corresponds to kinematic steering of the front wheels, $a_y$ is the lateral acceleration of the vehicle, and $k_f$ is an optimization parameter determined by testing of the vehicle, and where $k_f a_y$ accounts for roll steering and compliance steering of front wheels of the vehicle. The rear steering angle $\delta_r$ may be given by $$\delta_r = k_r a_y,$$

where $a_y$ is the lateral acceleration of the vehicle, and $k_r$ is an optimization parameter determined by testing of the vehicle, and where $k_r a_y$ accounts for roll steering and compliance steering of rear wheels of the vehicle.

In still another embodiment, a vehicle includes the apparatus and or performs the method using a motor configured to drive wheels of the vehicle. The vehicle also includes a chassis supporting axles on which the wheels are mounted and a steering mechanism coupled to the wheels and configured to control at least one of the front steering angle or the rear steering angle based on activation of the steering control. A brake actuator on the vehicle is configured to actuate brakes for one or more of the wheels based on activation of the braking control. Activating an indicator may involve activating a lane departure warning indicator or a collision warning indicator. Activating a vehicle control may involve activating a steering control and generating and/or receiving a steering angle control signal for at least one of the front steering angle or the rear steering angle based on activation of the steering control, and/or activating a braking control and generating or receiving a braking control signal for actuating brakes on one or more of the wheels based on activation of the braking control. The vehicle may be an electric vehicle.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts:

FIGS. 8A and 8B depict examples of relationships between lateral tire force and cornering stiffness, respectively, on tire slip angle;

DETAILED DESCRIPTION

Figure 1:
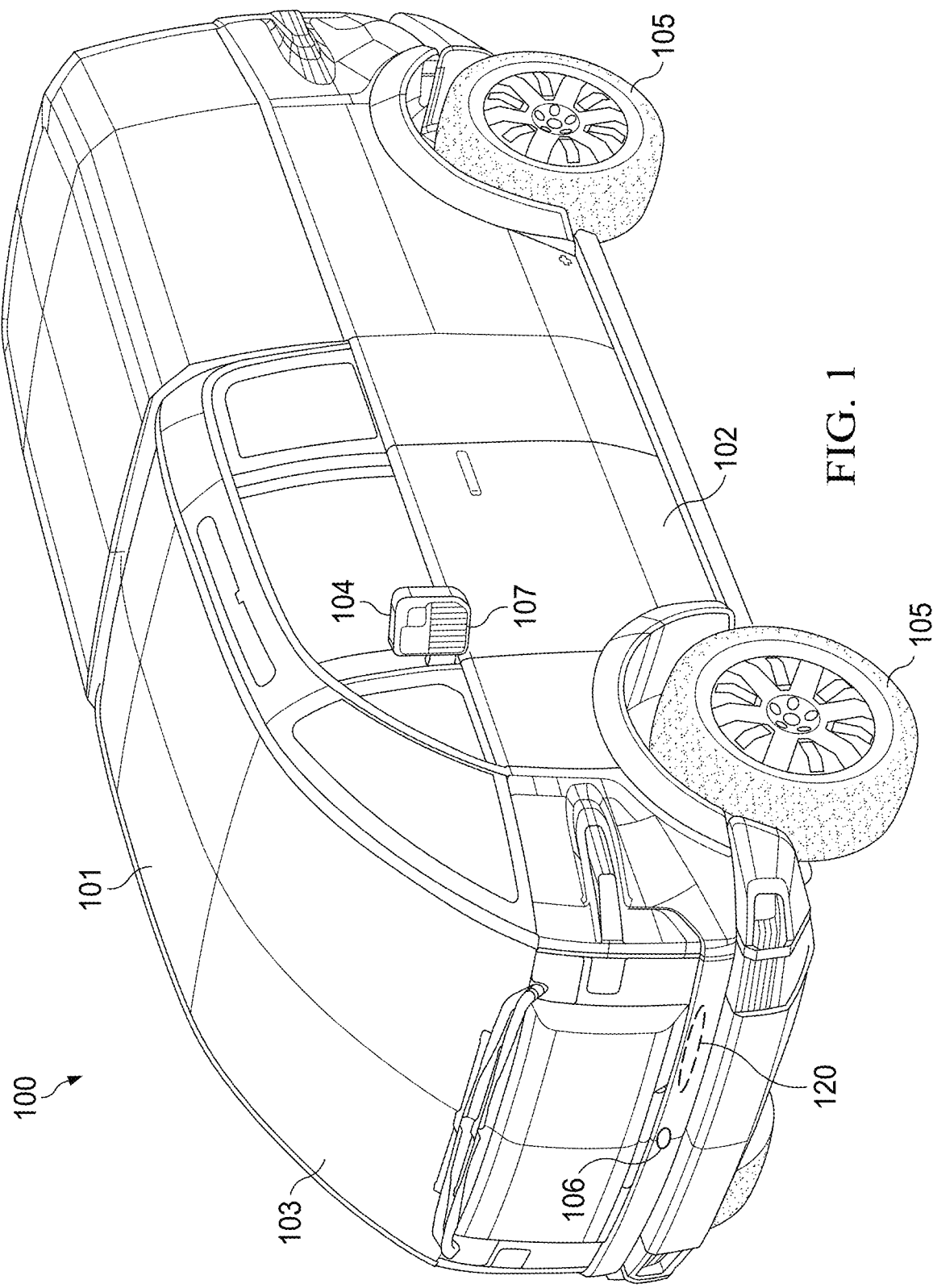
FIG. 1 is a perspective view of a vehicle within which operation or motion control based on an enhanced vehicle dynamic model is implemented in accordance with embodiments of the present disclosure.

FIGS. 1 through 10, described below, and the various embodiments used to describe the principles of this disclosure are by way of illustration only and should not be construed in any way to limit the scope of this disclosure. Those skilled in the art will understand that the principles of this disclosure may be implemented in any type of suitably arranged device or system.

The purpose of vehicle dynamic model is to develop algorithms for path planning and control in ADAS and AD features, where the algorithms are designed based on a vehicle dynamic model. There are two main requirements of a vehicle dynamic model: high fidelity, and simplicity. The vehicle model should match the real vehicle (high fidelity) and be simple enough for design and implementation of a path planner and controller. These two requirements of high fidelity and simplicity are in tension with each other, so meeting both requirements is challenging.

The widely used bicycle model is simple and useful for designing controller, but has fidelity limited to maneuvers where lateral acceleration is up to around 5 meters per square second (m/s²) due to assumptions of the constant cornering stiffness. The basic linear bicycle model is therefore limited in designing a controller that covers all the driving ranges, including high maneuvers involving, for example, lateral acceleration ranging from 5 to 10 [m/s2].

Manual Tuning

Manual tuning of the bicycle model applies weights on the cornering stiffnesses ($C_f$, $C_r$) based on lateral acceleration ($a_y$). For example, the weights applied are 1 on $C_f$ and $C_r$ when $|a_y| \leq 5$ [m/s²], whereas the applied weights are less than 1 when $|a_y| \geq 5$ [m/s²], so that the linear bicycle model with varying $C_f$ and $C_r$ better matches the real vehicle at the main signals of yaw rate, lateral acceleration, and side-slip angle.

The assumptions of the bicycle dynamic model are that: velocity V is slowly changing (i.e., $\dot{V}=0$) and $\beta$ is small (i.e., $\cos(\beta) \approx 0$, $\sin(\beta) \approx \beta$, such that $V_x = V \cos(\beta) \approx V$, $V_y = V \sin(\beta) \approx V\beta$ and $\dot{V}_y = \dot{\beta}$. The kinematics of the bicycle model are:

$$\dot{R} = ub_x + vb_y$$
$$\ddot{R} = \dot{u}b_x + u\dot{b}_x + \dot{v}b_y + v\dot{b}_y$$
$$= (\dot{u} - rv)b_x + (\dot{v} + ru)b_y$$

where $b_x$, $b_y$ is unit vector of body frame. The dynamics of the bicycle model are:

$$m\ddot{y} = \Sigma F_y, m(\dot{v}+ru) = mV(\dot{\beta}+r) = \Sigma F_y = F_{FL} + F_{FR}$$

$$I_z \ddot{\psi} = \Sigma M_z, I_z \dot{r} = \Sigma M_z = l_f(F_{FL}+F_{FR}) - l_r(F_{RL}=F_{RR})$$

With the assumption that: $F_{FL}=F_{FR}=C_f a_f$, and $F_{RL}=F_{RR}=C_r a_r$:

$$\dot{\beta} = -r + 2\frac{C_f}{mV_x}\left(\delta_f - \beta - \frac{l_f r}{V_x}\right) + 2\frac{C_r}{mV_x}\left(\delta_r - \beta + \frac{l_r r}{V_x}\right)$$

$$\dot{r} = 2\frac{l_f C_f}{I_z}\left(\delta_f - \beta - \frac{l_f r}{V_x}\right) - 2\frac{l_r C_r}{I_z}\left(\delta_r - \beta + \frac{l_r r}{V_x}\right)$$

where V: vehicle speed, x, y, z: longitudinal/lateral/yaw direction of vehicle, $\beta$: side-slip angle of vehicle, u, v, r: the velocity of velocity of longitudinal/lateral/yaw direction, m, $I_z$: translational/rotational mass inertia, $l_f$, $l_r$: front/rear wheel-base length, $F_y$, $M_z$: force and moment applied to vehicle, $F_{ij}$: tire forces at ij location of front left (FL) to rear right (RR), $C_f$, $C_r$: tire cornering stiffness at front/rear, and $\delta_f$, $\delta_r$: front/rear road wheel angle.

In the state-space representation:

$$\dot{\Sigma} = A\Sigma + Bu$$

where $\Sigma = [\beta, r]^T$, $u = [\delta_f, \delta_r]_T$, $A = A(C_f, C_r, V_x, m, I_z, l_f, l_r)$, and $B = B_f$ ($C_f, C_r, V_x, m, I_z, l_f$). In a full form:

$$\begin{Bmatrix} \dot{\beta} \\ \dot{r} \end{Bmatrix} = \begin{bmatrix} \frac{-2}{mV_x}(C_f + C_r) & -1 + \frac{2(-l_f C_f + l_r C_r)}{mV_x^2} \\ \frac{2}{I_z}(-l_f C_f + l_r C_r) & \frac{-2}{I_z V_x}(l_f^2 C_f + l_r^2 C_r) \end{bmatrix}$$

-continued $$\{\beta \atop r\} + \begin{bmatrix} 2\frac{C_f}{mV_x} & 2\frac{C_r}{mV_x} \\ 2\frac{l_f C_f}{I_z} & -2\frac{l_r C_r}{I_z} \end{bmatrix} \{\delta_f \atop \delta_r\}.$$

Multi-Degree-of-Freedom Analytic Modeling

Multi-degree-of-freedom analytic modeling modifies the bicycle model with estimation of tire cornering stiffness, vertical tire force, and longitudinal tire force.

A. Tire Cornering Stiffness Estimation

Figure 7A:
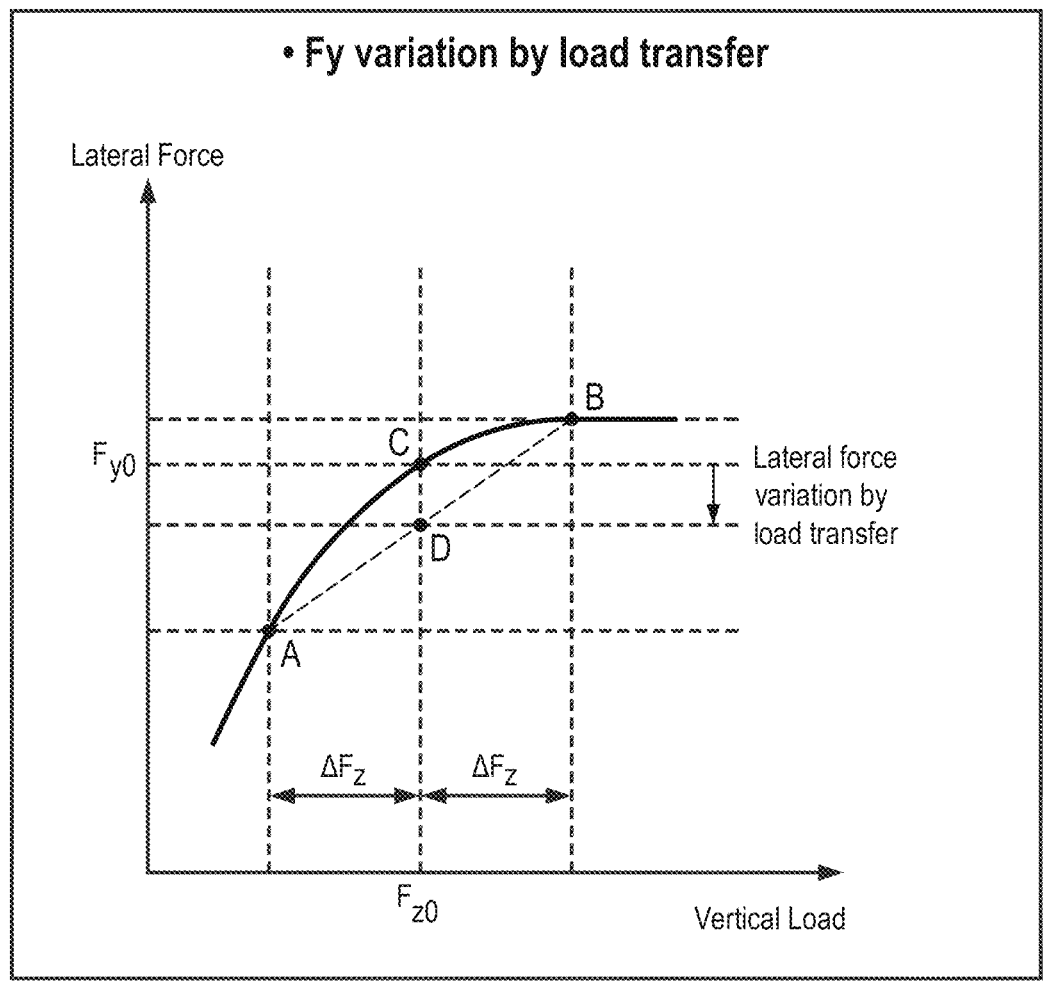
FIG. 7A depicts an exemplary relationship between lateral tire force and vertical load.
Figure 7B:
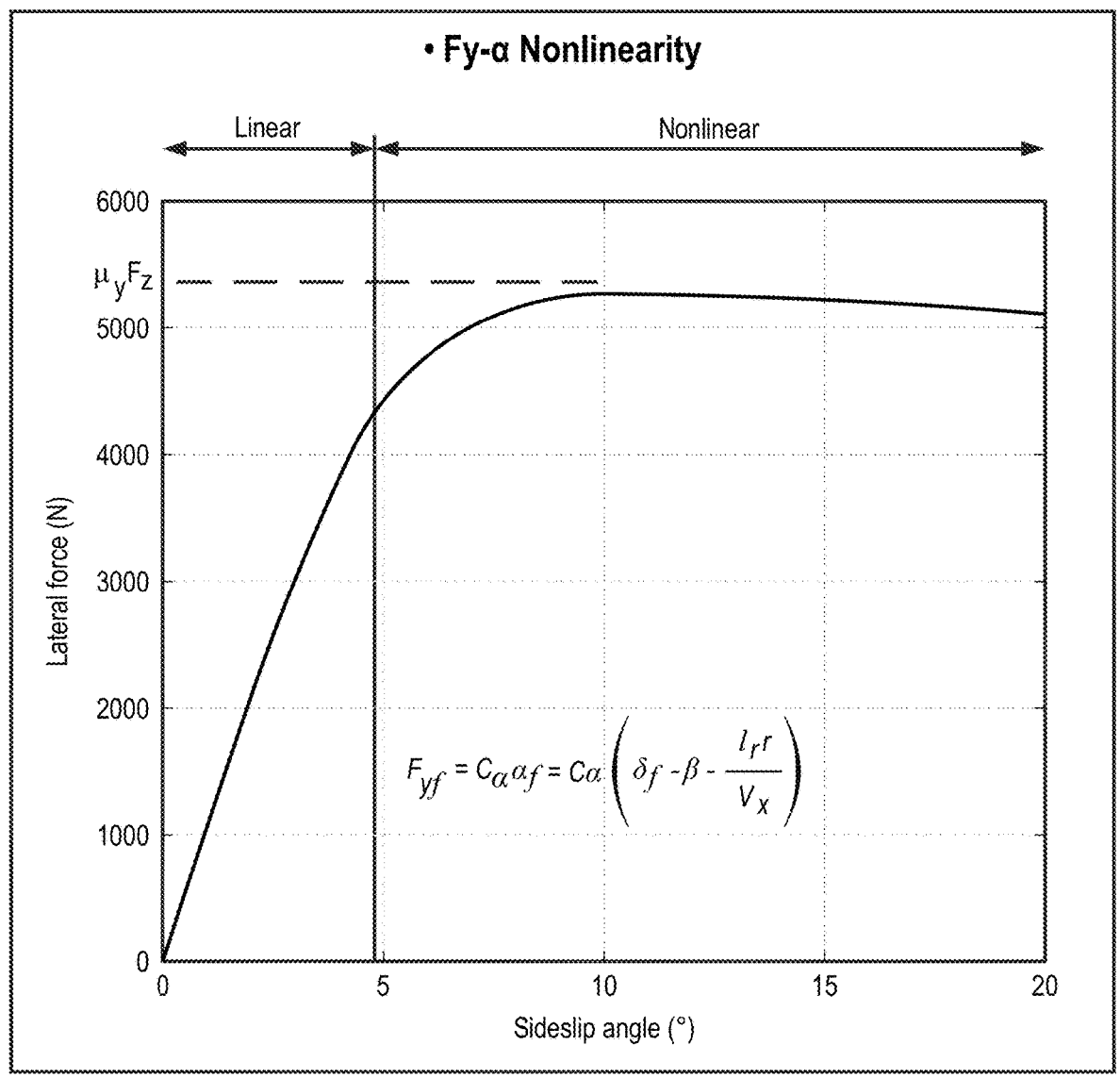
FIG. 7B depicts an example of linear and nonlinear regimes between lateral tire force and tire sideslip angle.
Figure 7C:
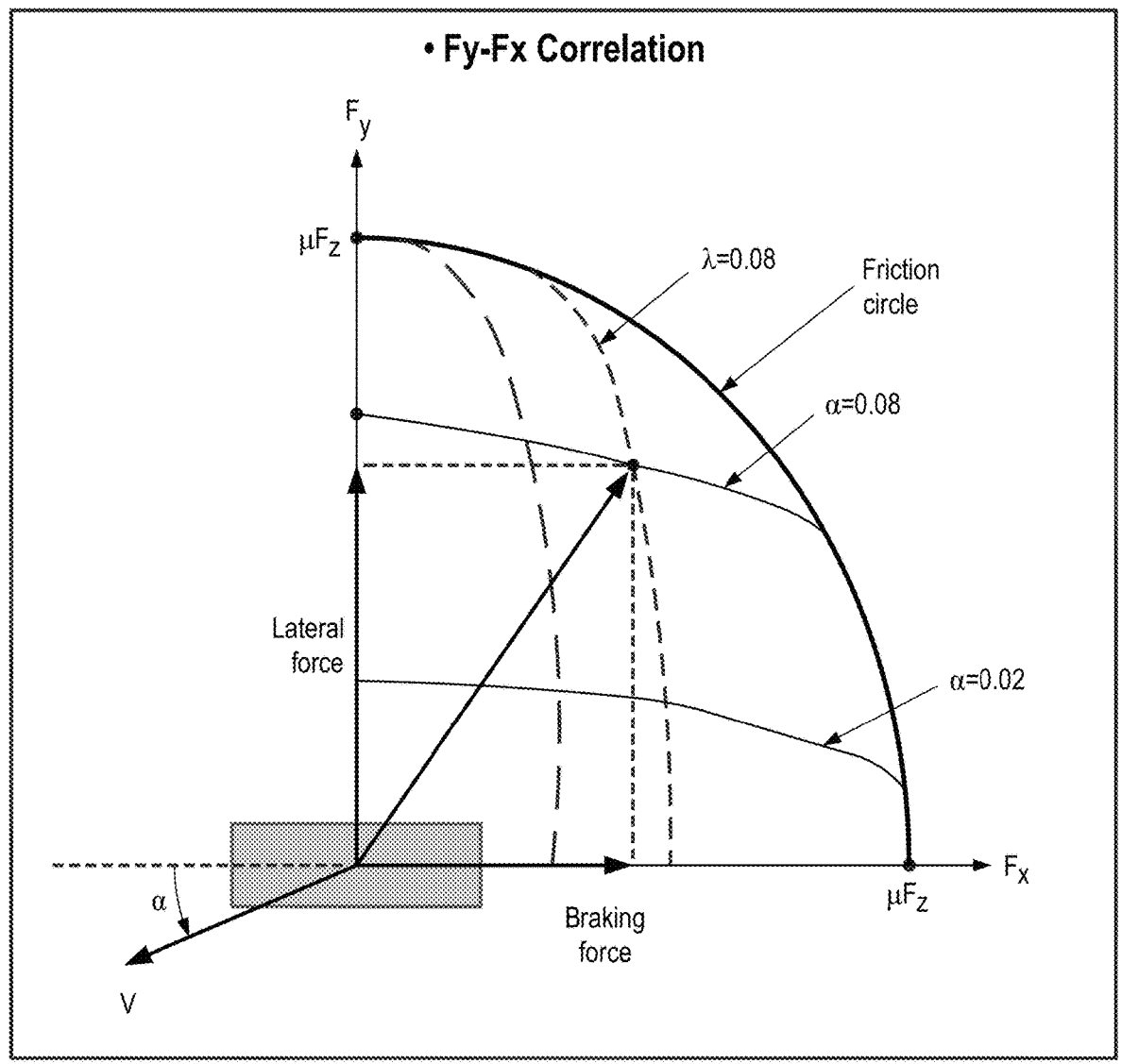
FIG. 7C depicts an example of the effect of combined slip within the friction circle of a tire.

Tire cornering stiffness estimation considers effects on lateral tire force ($F_y$). The relationship between lateral tire force and vertical load is shown in FIG. 7A. Notice that the relationship is nonlinear, so that the effective lateral tire force is reduced (C→D) by the lateral load transfer (($\Delta F_z$). FIG. 7B depicts linear and nonlinear regimes between lateral tire force and tire sideslip angle. FIG. 7C depicts the effect of combined slip within the friction circle of a tire:

$$F_x^2 + F_y^2 \le \mu^2 F_z^2.$$

Figure 8A:
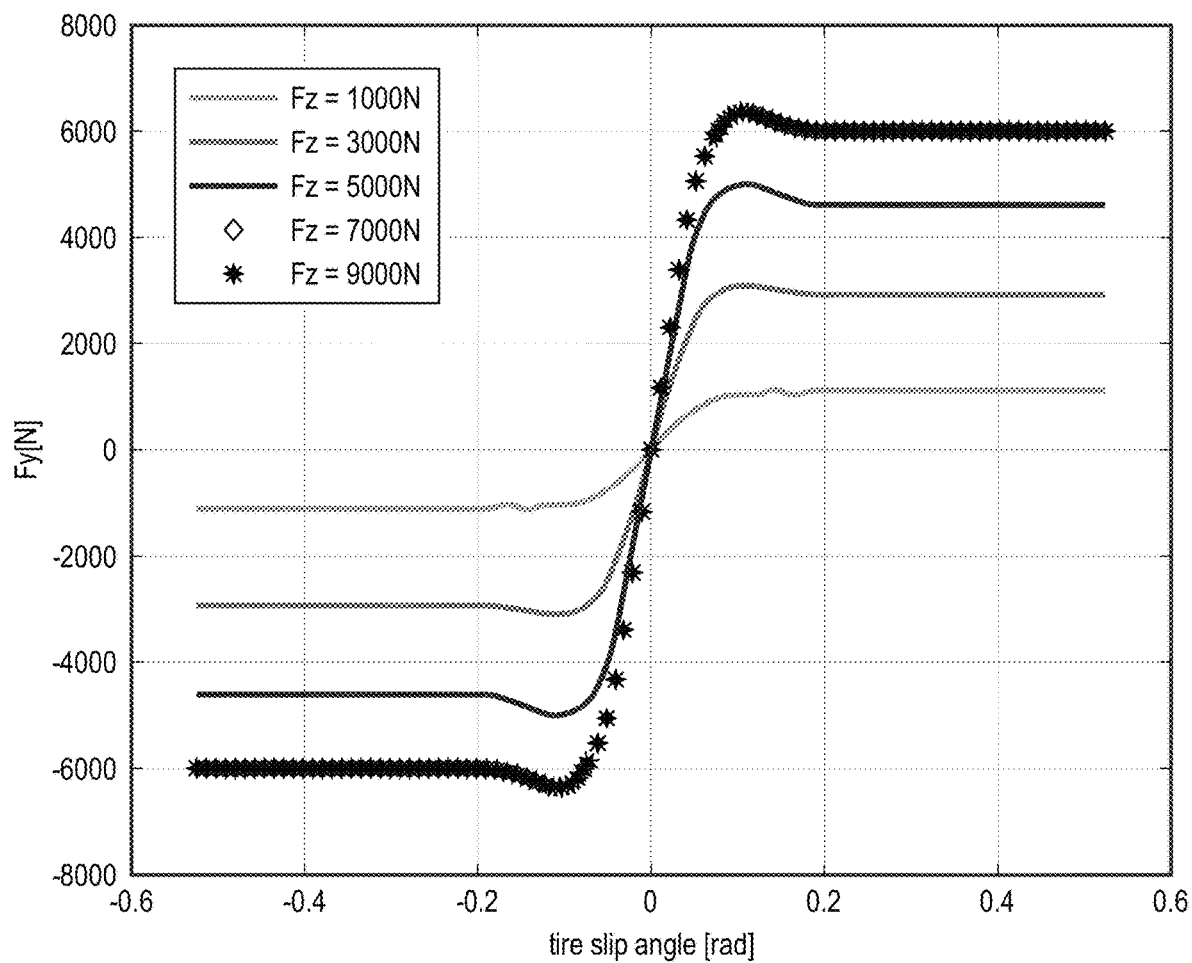
Figure 9:
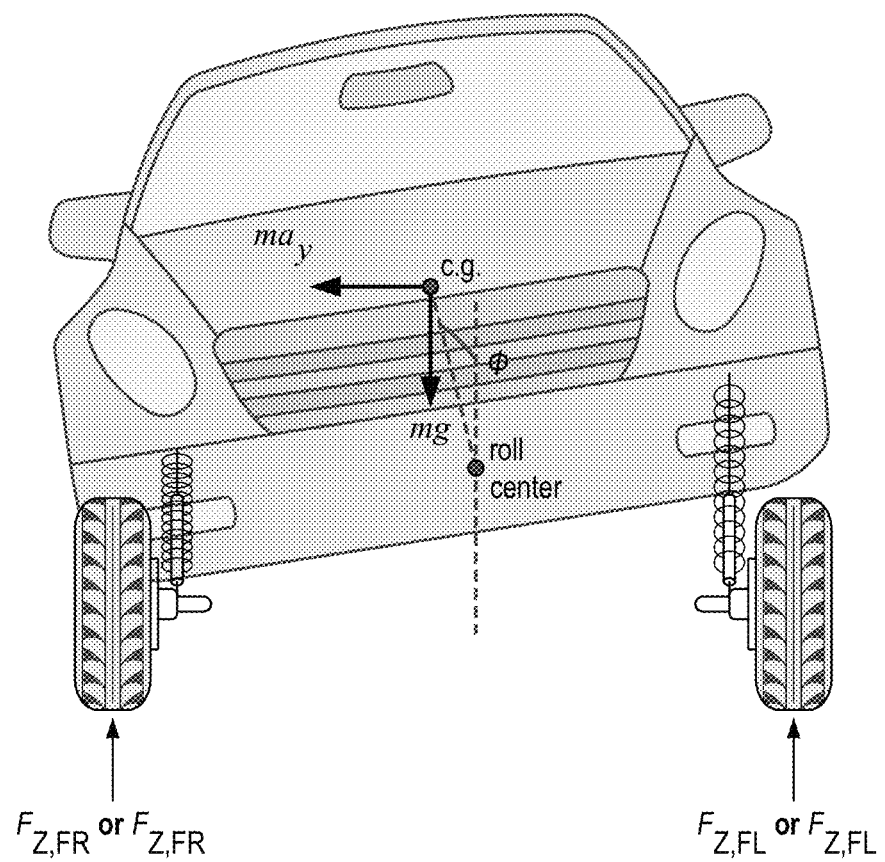
FIG. 9 illustrates a model for determining the effect of lateral and longitudinal load transfer on vertical tire force.

Tire cornering stiffness estimation also considers the effect of vertical and longitudinal tire forces, such as Pacejka's empirical tire model, which includes:

Lateral tire force ($F_y$) as function of longitudinal tire force;

Cornering stiffness ($C_{ij}$ for ij=FL, FR, RL, RR) on combined slip conditions; and The estimation of longitudinal and vertical tire forces ($F_x$, $F_z$) involves:

$$\varphi_x = \frac{\sqrt{\mu^2 F_z^2 - F_x^2}}{\mu F_z}$$

$$C_\alpha(\mu, F_z, F_x) = \varphi_x \cdot \left\{ C_\alpha(\mu, F_z, F_x = 0) - \frac{1}{2}\mu F_z \right\} + \frac{1}{2}(\mu F_z - F_x)$$

where $C_\alpha(\mu, F_z, F_x=0)$: cornering stiffness of pure slip without longitudinal slip according to $F_z$ variation. Examples of relationships between lateral tire force and cornering stiffness, respectively, on tire slip angle are depicted in FIGS. 8A and 8B.

$F_z$ Estimation

Tire vertical forces $F_z$ are affected by lateral and longitudinal load transfer, which come from the longitudinal and lateral acceleration ($a_x$, $a_y$, respectively, in [m/s²]). $F_z$ estimation based on the model depicts in FIG. 9 employs:

$$F_{z\_FL} = F_{SW,F} - W_{LTLT,F} - W_{LGLT}$$

$$F_{z\_FR} = F_{SW,F} + W_{LTLT,F} - W_{LGLT}$$

$$F_{z\_RL} = F_{SW,R} - W_{LTLT,R} - W_{LGLT}$$

$$F_{z\_RR} = F_{SW,R} + W_{LTLT,R} - W_{LGLT}$$

The longitudinal load transfer $W_{LGLT}$ is:

$$W_{LGLT} = \frac{m_s}{2} \frac{h_s}{L} a_x.$$

The lateral load transfers $W_{LTLT,F}$ and $W_{LTLT,R}$ are:

$$W_{LTLT,F} = \frac{a_y m_s}{t_f} \left[ \frac{K_{\phi f} h_s}{K_{\phi f} + K_{\phi r} - m_s g h_s} + \frac{l_r}{L} h_f \right]$$

$$W_{LTLT,R} = \frac{a_y m_s}{t_r} \left[ \frac{K_{\phi r} h_s}{K_{\phi f} + K_{\phi r} - m_s g h_s} + \frac{l_f}{L} h_r \right]$$

The static weights $F_{SW,F}$, $F_{SW,R}$ are:

$$F_{SW,F} = \left( m_s \frac{l_r}{L} + m_{uf} \right) \frac{g}{2}$$

$$F_{SW,R} = \left( m_s \frac{l_f}{L} + m_{ur} \right) \frac{g}{2}$$

where g: gravity [m/s2], $m_s$: sprung mass, $m_{uf}$, $m_{ur}$: front/rear un-sprung mass, $l_f$, $l_r$: front/rear wheelbase (L=$l_f$+$l_r$), $t_f$, $l_r$: front/rear track width, $h_s$: roll center height from ground, $h_f$, $h_r$: heights of front/rear roll center from the ground, $K_{\phi f}$, $K_{\phi r}$: front/rear roll stiffness.

$F_x$ Estimation

Figure 10:
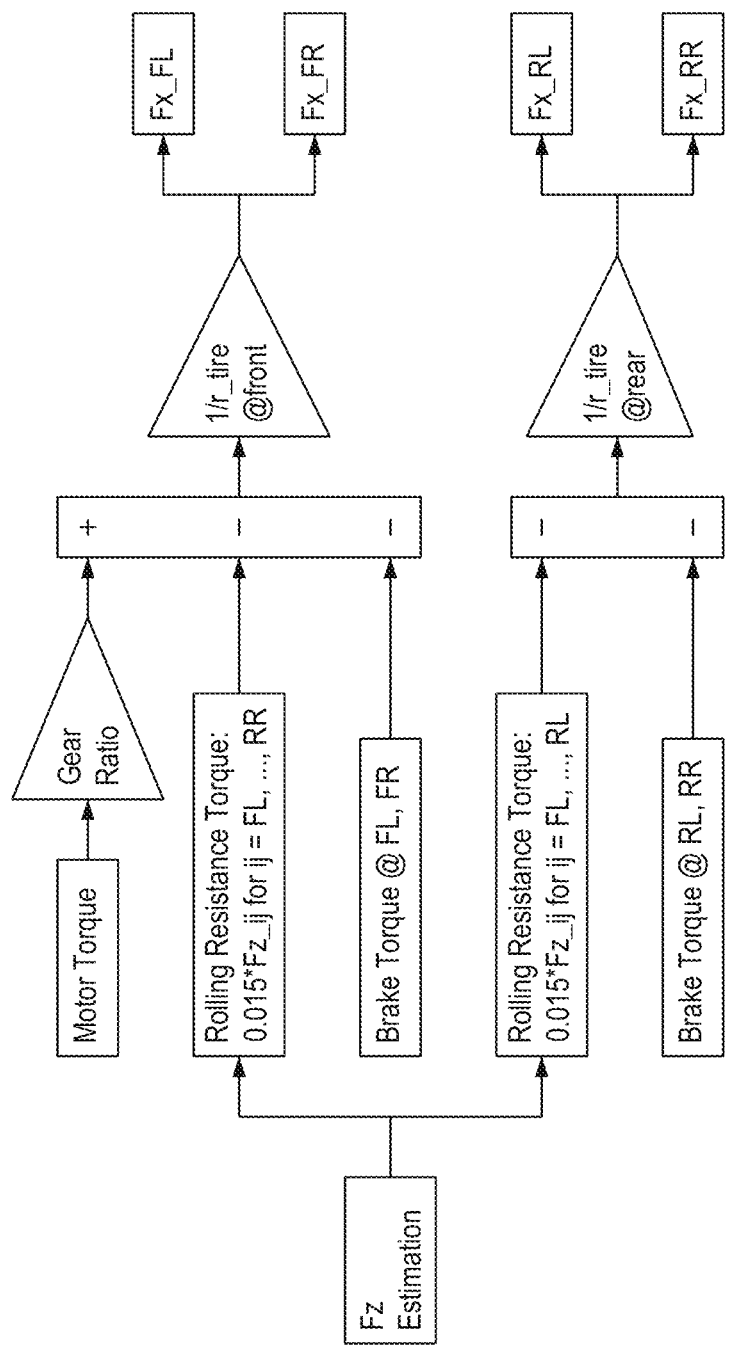
FIG. 10 illustrates estimation of longitudinal tire force from vertical tire force and other parameters.

Longitudinal tire forces $F_x$ are affected by driving/brake/rolling resistance torque, parameters of gear ratio, and effective rolling radius of tire. In a front wheel drive example, the estimation of longitudinal tire force is illustrated in FIG. 10.

FIG. 1 is a perspective view of a vehicle 100 within which operation or motion control based on an enhanced vehicle dynamic model is implemented in accordance with embodiments of the present disclosure. The embodiment of the vehicle 100 illustrated in FIG. 1 is for illustration and explanation only. FIG. 1 does not limit the scope of this disclosure to any particular implementation of a vehicle.

The vehicle 100 of FIG. 1 includes a chassis (not visible in FIG. 1) supporting a cabin 101 for carrying passengers. In some embodiments, the vehicle 100 is an EV in which the chassis is in the form of a "skateboard" vehicle platform supporting one or more energy storage elements (e.g., batteries) that provide input electrical power used by various components of the EV, such as one or more electric motors of the vehicle 100 and a control system of the electric vehicle described in further detail below. In other embodiments, the vehicle 100 is a combustion engine vehicle.

Passengers may enter and exit the cabin 101 through at least one door 102 forming part of the cabin 101. A transparent windshield 103 and other transparent panels mounted within and forming part of the cabin 101 allow at least one passenger (referred to as the "operator," even when the vehicle 100 is operating in an AD mode) to see outside the cabin 101. Rear view mirrors 104 mounted to sides of the cabin 101 enable the operator to see objects to the sides and rear of the cabin 101 and may include warning indicators (e.g., selectively illuminated warning lights) for ADAS features such as blind spot warning (indicating that another vehicle is in the operator's blind spot) and/or lane departure warning.

Wheels 105 mounted on axles that are supported by the chassis and driven by the motor(s) (all not visible in FIG. 1) allow the vehicle 100 to move smoothly. The wheels 105 are mounted on the axles in a manner permitting rotation relative to a longitudinal centerline of the vehicle 100 for steering and are also connected to steering controls (not visible). Conventional automobile features such as headlamps, taillights, turn signal indicators, windshield wipers, and bumpers are also depicted. The vehicle 100 may further include cargo storage within or connected to the cabin 101 and mounted on the chassis, with the cargo storage area(s) optionally partitioned by dividers from the passenger area(s) of the cabin 101.

In the present disclosure, the vehicle 100 includes a vision system including at least a front camera 106, side cameras 107 (mounted on the bottoms of the rear view mirrors 104 in the example depicted), and a rear camera. The cameras 106, 107 provide images to the vehicle control system for use as part of ADAS and AD features as described below, and the images may optionally be displayed to the operator. In addition, the vehicle 100 includes a radar transceiver 120 (shown in phantom in FIG. 1, as not visible from the exterior of vehicle 100).

Although FIG. 1 illustrates one example of a vehicle 100, those skilled in the art will recognize that the full structure and operation of a suitable vehicle are not depicted in the drawings or described here. Instead, for simplicity and clarity, only the structure and operation necessary for an understanding the present disclosure is depicted and described. Various changes may be made to the example of FIG. 1, and the enhanced vehicle dynamic model described in this disclosure may be used with any other suitable vehicle.

Figure 2:
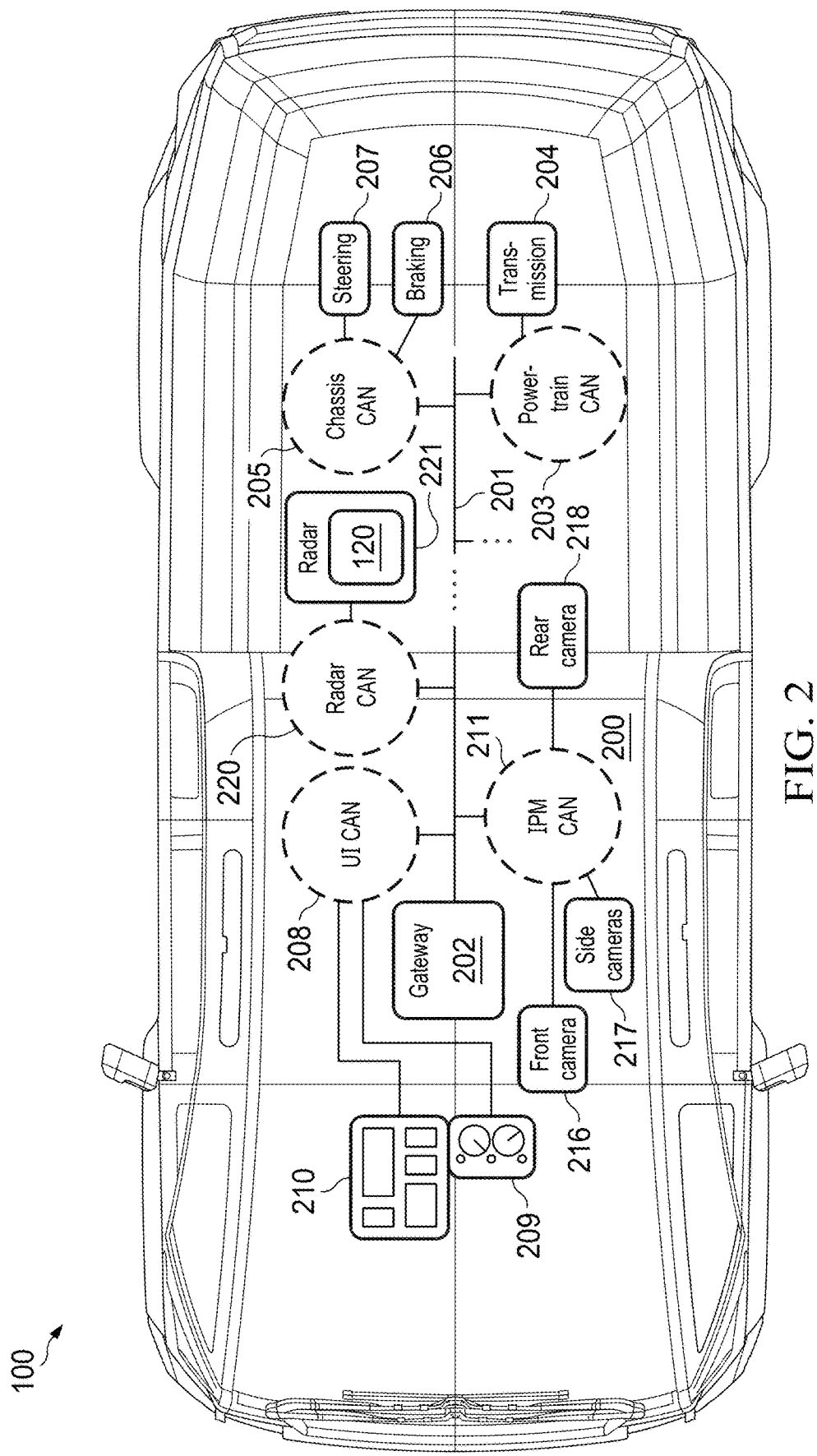
FIGS. 2 and 2A depict a vehicle control system for a vehicle within which operation or motion control based on an enhanced vehicle dynamic model is implemented in accordance with embodiments of the present disclosure.
Figure 2A:
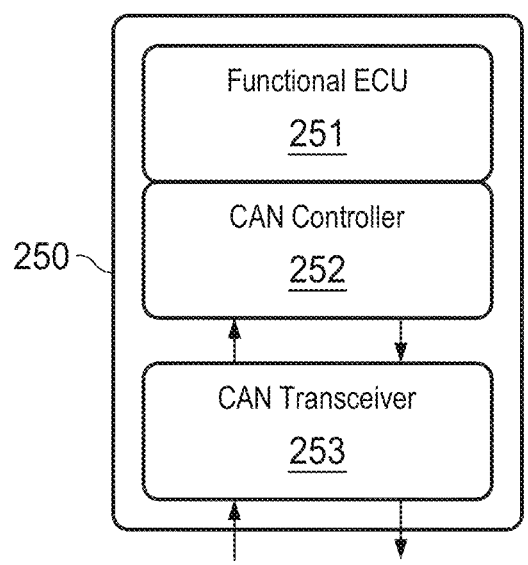

FIGS. 2 and 2A depict a vehicle control system 200 for a vehicle within which operation or motion control based on an enhanced vehicle dynamic model is implemented in accordance with embodiments of the present disclosure. The embodiment of the vehicle control system 200 illustrated in FIGS. 2 and 2A is for illustration and explanation only. FIGS. 2 and 2A do not limit the scope of this disclosure to any particular implementation of a vehicle control system.

FIG. 2 depicts a modern vehicle control system 200 utilizing various electronic control units (ECUs) interconnected on a controller area network (CAN) via the so-called CAN bus. The standard for the CAN bus was released around 1993 by the International Organization for Standardization (ISO) as ISO 11898. The current version of that standard is ISO 11898-1:2015, and the CAN busses described herein may comply with that standard in some embodiments. Each ECU typically includes a printed circuit board (PCB) with a processor or microcontroller integrated circuit coupled to various input sensors, switches, relays, and other output devices. The CAN design permits the ECUs to communicate with each other without the need for a centralized host. Instead, communication takes place on a peer-to-peer basis. The CAN design therefore permits data from sensors and other ECUs to circulate around the vehicle ECUs, with each ECU transmitting sensor and programming information on the CAN bus while simultaneously listening to the CAN bus to pull out data needed to complete tasks being performed by that ECU. There is no central hub or routing system, just a continuous flow of information available to all the ECUs.

By way of example, power doors on a vehicle may be operated by an ECU called the body control module (not shown in FIG. 2). Sensors constantly report whether the doors are open or closed. When the driver pushes a button to close a door, the signal from that switch is broadcast across the CAN bus. When the body control module ECU detects that signal, however, the body control module ECU does not simply close the door. Instead, the body control module ECU first checks the data stream to make sure the vehicle is in park and not moving and, if all is well, gives a command to a power circuit that energizes the motors used to close the door. The body control module ECU may go even further, such as by monitoring the voltage consumed by the motors. If the body control module ECU detects a voltage spike, which happens when a door is hindered by an errant handbag or a wayward body part, the ECU immediately reverses the direction of the door to prevent potential injury. If the door closes properly, the latch electrically locks the door shut, which is an event that may be detected by the body control module ECU.

Notably, vehicle control systems are migrating to higher-speed networks with an Ethernet-like bus for which each ECU is assigned an Internet protocol (IP) address. Among other things, this may allow both centralized vehicle ECUs and remote computers to pass around huge amounts of information and participate in the Internet of Things (IoT).

In the example shown in FIG. 2, the vehicle control system 200 includes a CAN bus 201 embodied or controlled by a gateway ECU 202, which facilitates messages on and among CANs, transmitted and detected by ECUs. FIG. 2 illustrates a powertrain CAN 203 to which a transmission ECU 204 is connected and a chassis CAN 205 to which a braking ECU 206 and a steering (e.g., steering angle) ECU 207 are connected. The braking ECU 206 is connected to brake actuator(s) (not shown) for emergency and normal braking, while the steering ECU 207 is connected to a steering drive motor for evasive and normal steering. The vehicle control system 200 in FIG. 2 also includes a user interface (UI) CAN 208 to which a "dashboard" ECU 209 and a touchscreen ECU 210 are connected. The ECUs 209 and 210 may be integrated with the respective dashboard controls and touchscreen. The UI CAN 208 and the associated dashboard ECU 209 and touchscreen 210 allow the operator to set operating parameters such as following distance for ACC, enable or disable ADAS indicators such as blind spot detection or collision warning, and the like. The dashboard ECU 209 may be connected to sensors and indicators other than those on the dashboard, such as the rear view mirror blind spot indicators described above. The ADAS indicators may include illuminated indicators on any combination of the dashboard and the rear view mirrors and/or in a heads-up display projected onto the windshield 103; audio warnings sounded on the vehicle's audio system speakers; and/or haptic indicators such as a vibrator within the vehicle operator's seat.

For the present disclosure, the vehicle control system 200 includes an image processing module (IPM) CAN 211 to which the front camera ECU 216, side camera ECU 217, and rear camera ECU 218 are connected. The front camera ECU 216 receives image data from the front camera 106 on the vehicle 100, while the side camera ECU 217 receives image data from each of the side cameras 107 and the rear camera ECU 218 receives image data from the rear camera. In some embodiments, a separate ECU may be used for each camera, such that two side camera ECUs may be employed. The IPM CAN 211 and the front camera ECU 216, side camera ECU 217, and rear camera ECU 218 process image data for use in vision-based ADAS features, such as providing a rear back-up camera display and/or stitching together the images to create a "bird's eye" view of the vehicle's surroundings.

For the present disclosure, the vehicle control system 200 also includes a radar CAN 220 to which a radar ECU 221 and a radar transceiver are connected. The radar CAN 220, radar ECU 221, and radar transceiver are used to detect objects around the vehicle 100 and to measure the relative distance to and velocity of those objects.

FIG. 2A illustrates a high level block diagram for the architecture 250 of each CAN depicted in FIG. 2. Each CAN shown in FIG. 2, including the IPM CAN 211, includes a functional ECU 251 for the specific function performed by the respective CAN (e.g., image processing in the case of IPM CAN 211). The functional ECU 251 is coupled to a CAN controller 252 that controls the interactions of the respective CAN with the other CANs within the vehicle 100 through the gateway ECU 202. A CAN transceiver 253 receives messages from and transmit messages to other CANs under the control of the CAN controller 252.

Although FIGS. 2 and 2A illustrate one example of a vehicle control system 200, those skilled in the art will recognize that the full structure and operation of a suitable vehicle control system is not depicted in the drawings or described here. Instead, for simplicity and clarity, only the structure and operation necessary for an understanding the present disclosure is depicted and described. Various changes may be made to the example of FIGS. 2 and 2A, and the operation control based on an enhanced vehicle dynamic model described in this disclosure may be used with any other suitable vehicle control system.

To support various ADAS and AD functions such as lane departure warning, collision detection/warning, steering assistance or evasive steering, and emergency braking, the IPM CAN 211 for the vehicle 100 detects an occupied traffic lane within which the vehicle 100 is traveling, predicts the path of the vehicle 100 within that lane, and/or detects other vehicles in adjacent lanes or cutting-in to the occupied lane for collision detection. Such functionality often uses a dynamic model for the vehicle 100, to predict vehicle behavior. As noted above, the bicycle model has fidelity for lateral acceleration up to around 5 [m/s$^2$]. Refinements described above may improve fidelity, but at the expense of simplicity. In the present disclosure, an enhanced vehicle dynamic model for controlling operation—activating indicator(s), a steering control, or a braking control—is described that improves fidelity, with acceptable increase in complexity.

Figure 3:
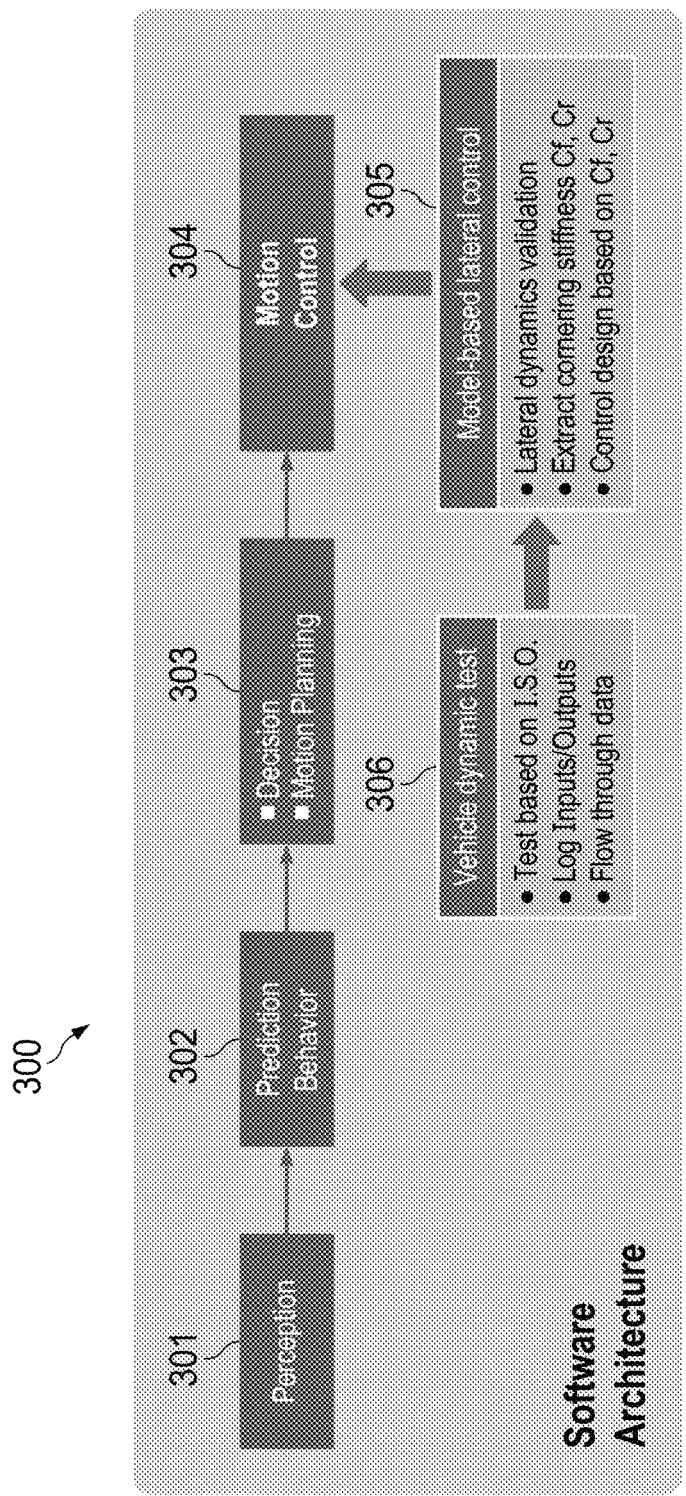
FIG. 3 illustrates a functional diagram of a system within a vehicle for performing operation or motion control based on an enhanced vehicle dynamic model in accordance with embodiments of the present disclosure.

FIG. 3 illustrates a functional diagram of a system 300 within a vehicle for performing operation or motion control based on an enhanced vehicle dynamic model in accordance with embodiments of the present disclosure. The embodiment of the system 300 illustrated in FIG. 3 is for illustration and explanation only. FIG. 3 does not limit the scope of this disclosure to any particular implementation. In some embodiments, the system 300 in FIG. 3 may be implemented by, or in connection with, the chassis CAN 205 and braking ECU 206 and steering ECU 207 in FIG. 2, including the functional (CAN) ECU 251, CAN processor/controller 252, and CAN transceiver 253 depicted in FIG. 2A for the chassis CAN 205. Lane detection for the system 300 in FIG. 3 may be implemented using, or by connection to, the front camera 106 and the side cameras 107 in FIG. 1 and the IPM CAN 211, front camera ECU 216, side camera ECU(s) 217, and rear camera ECU 218 in FIG. 2, including the functional (CAN) ECU 251, CAN processor/controller 252, and CAN transceiver 253 depicted in FIG. 2A for the IPM CAN 211. Target vehicle detection for the system 300 in FIG. 3 may be implemented using, or by connection to, the radar CAN 220 and radar ECU 221 depicted in FIG. 2, and the radar transceiver, including the functional (CAN) ECU 251, CAN processor/controller 252, and CAN transceiver 253 depicted in FIG. 2A for the radar CAN 220. Specific functions depicted in FIG. 3 may be distributed among those components.

To support ADAS and AD features, the system 300 includes the functions of camera perception 301, target vehicle behavior prediction 302, decision and motion planning 303, and motion control 304. Camera perception 301 detects a target vehicle that may cut-in to the lane ahead, while target vehicle behavior prediction 302 determines a likelihood that the target vehicle will cut-in to the lane ahead based on the target vehicle's distance and relative velocity and acceleration. Decision and motion planning 303 and motion control 304 respectively determine and, if necessary, implement reactive responses to cut-in by the target vehicle, such as collision warning, evasive steering, and/or emergency braking.

Motion control 304 implements at least motion-based lateral control 305. Motion-based lateral control 305 in the example of FIG. 3 is based on lateral dynamics validation, with extraction of cornering stiffness $C_f$, $C_r$, and control design based on those extracted parameters. Motion-based lateral control 305 may be based in part on vehicle dynamics test 306, which can include testing based on ISO standards, logging of inputs/outputs, and use of flow-through data.

Figure 4A:
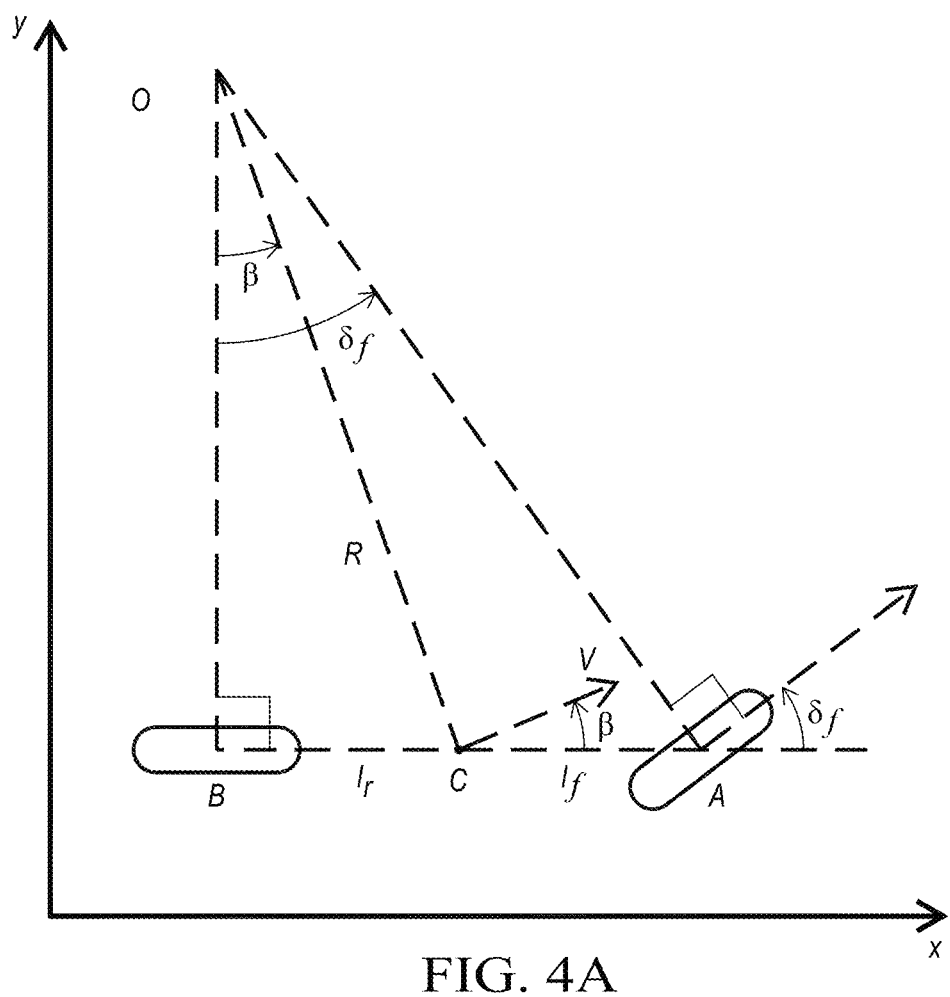
FIGS. 4A and 4B illustrate parameters used in both the basic and enhanced bicycle models of vehicle dynamics.
Figure 4B:
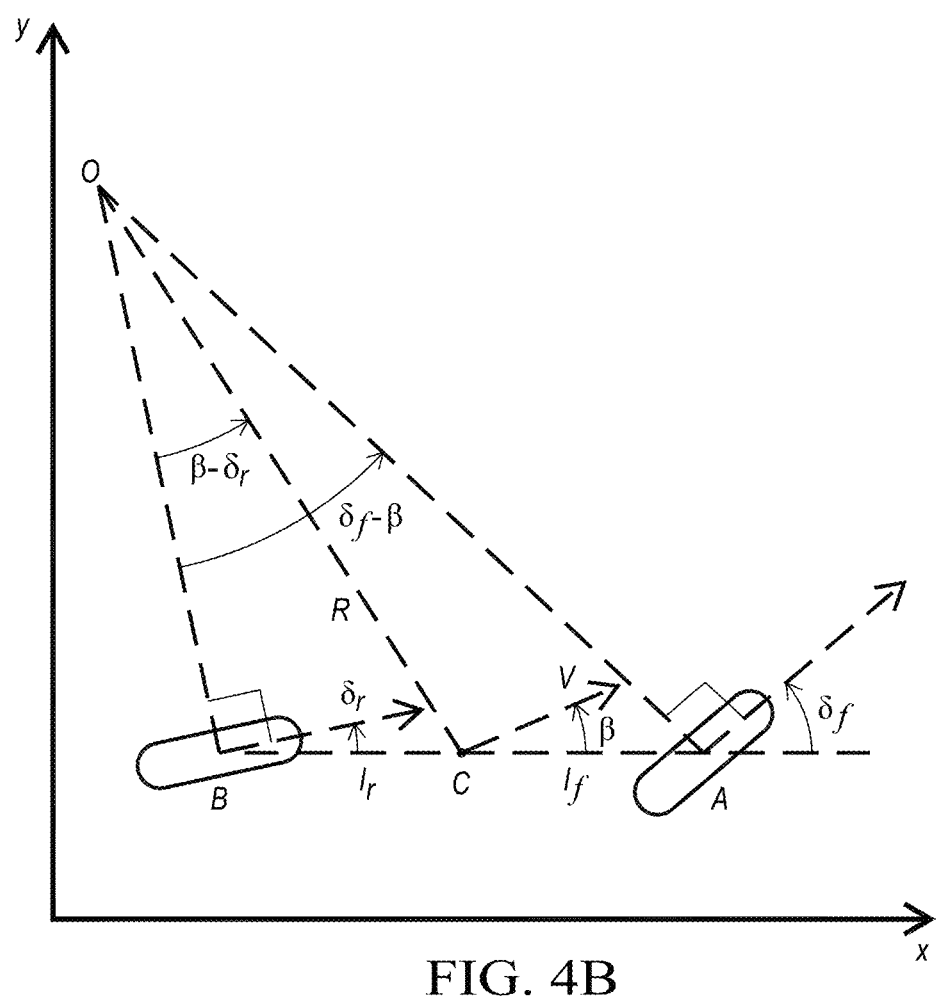

The enhanced vehicle dynamic model of the present disclosure is an enhanced bicycle model. FIGS. 4A and 4B illustrate parameters used in both the basic and enhanced bicycle models of vehicle dynamics, in particular during steering (lateral acceleration): O is the instantaneous rolling center of the turn; R is the radius from the vehicle center of gravity; A and B are the pivot points of the front and rear wheels, respectively, and $l_f$ and $l_r$ are the front/rear wheelbase length, respectively; β is the angle of the vehicle's velocity vector V relative to the x-axis, the longitudinal direction of the vehicle; $δ_f$ is the steering angle of the front wheels relative to the x-axis. FIG. 4A illustrates the bicycle model parameters for front-wheel steering only. FIG. 4B illustrates the parameters for a vehicle with Ackerman steering (front- and rear-wheel steering), and thus also includes $δ_r$, the steering angle of the rear wheels relative to the longitudinal x-axis.

For satisfying the requirements of high fidelity and simplicity, the vehicle model of the present disclosure is based on the widely used bicycle model, enhanced by modifying three main parts: varying cornering stiffness, and front/rear steer wheel angle estimation.

The varying cornering stiffness (where $C_f$, $C_r$ are tire cornering stiffness at the front/rear wheels, respectively) for the enhanced bicycle model of the present disclosure results from the simple variation of a sigmoid function, which does not require estimation of the longitudinal and vertical tire forces, but just three parameters to be optimized by test data. The front/rear road wheel angle ($δ_f$, $δ_r$, respectively) have extra terms to be tuned or optimized according to the lateral acceleration from test data, which covers the effect of not only kinematics but also compliance and roll steer.

Accordingly, the enhanced bicycle model of the present disclosure:
  keeps the same degree-of-freedom as the basic bicycle model;
  includes no external dynamics; and
  modifies cornering stiffnesses and the road wheel angle(s) with the variation of sigmoid function and corresponding parameters: a, b, c, $k_f$, $k_r$, on $C_f$, $C_r$, $δ_f$, $δ_r$.

A comparison of the conventional bicycle model and enhance bicycle model of the present disclosure follows:

| Modifications | Conventional bicycle model | Enhanced bicycle model |
|---|---|---|
| Cornering stiffness $C_{FL}$, $C_{FR}$, $C_{RL}$, $C_{RR}$ | $C_{FL} = C_{FR} = C_F$ = const. $C_{RL} = C_{RR} = C_R$ = const. | Optimization with a variation form of sigmoid function: |
| Front wheel angle $δ_f$: Kinematic steer: $δ_{f,kinematic}$ Roll steer: $δ_{f,roll}$ Compliance steer: $δ_{f,compliance}$ | $δ_f = δ_{f,kinematic}$ only | $δ_f = δ_{f,kinematic} + k_f a_y$, where $k_f a_y$ covers both $δ_{f,roll}$ and $δ_{f,compliance}$ |

-continued

| Modifications | Conventional bicycle model | Enhanced bicycle model |
|---|---|---|
| Rear wheel angle $\delta_r$: | $\delta_r = 0$ only | $\delta_r = k_r a_y$, where $k_r a_y$ covers both $\delta_{r,roll}$ and $\delta_{r,compliance}$ |
| No kinematic steer: $\delta_{f,kinematic} = 0$ | | |
| Roll steer: $\delta_{r,roll}$ | | |
| Compliance steer: $\delta_{r,compliance}$ | | |

From the basic bicycle model:

$$\left\{\begin{matrix}\dot{\beta}\\\dot{r}\end{matrix}\right\} = \begin{bmatrix} \frac{-2}{mV_x}(C_f + C_r) & -1 + \frac{2(-l_f C_f + l_r C_r)}{mV_x^2} \\ \frac{2}{I_z}(-l_f C_f + l_r C_r) & \frac{-2}{I_z V_x}(l_f^2 C_f + l_r^2 C_r) \end{bmatrix}$$

$$\left\{\begin{matrix}\beta\\r\end{matrix}\right\} + \begin{bmatrix} 2\frac{C_f}{mV_x} & 2\frac{C_r}{mV_x} \\ 2\frac{l_f C_f}{I_z} & -2\frac{l_r C_r}{I_z} \end{bmatrix} \left\{\begin{matrix}\delta_f\\\delta_r\end{matrix}\right\}$$

where $\dot{\beta}$ is the derivative of $\beta$ with respect to time and $\dot{r}$ is the derivative of r; $V_x$ is the longitudinal component of the vehicle's velocity V; and m, $I_z$ are translational/rotational mass inertia for the vehicle.

In the enhanced bicycle model of the present disclosure, the front and rear road wheel angles include an add-on effect from lateral acceleration $A_y$:

$$\left\{\begin{matrix}\delta_f\\\delta_r\end{matrix}\right\} = \left\{\begin{matrix}\delta_f + k_f A_y\\k_r A_y\end{matrix}\right\} = \begin{bmatrix}1 & k_f\\0 & k_r\end{bmatrix}\left\{\begin{matrix}\delta_f\\A_y\end{matrix}\right\},$$

such that the resulting enhanced bicycle dynamic model follows:

$$\left\{\begin{matrix}\dot{\beta}\\\dot{r}\end{matrix}\right\} = \begin{bmatrix} \frac{-2}{mV_x}(C_f + C_r) & -1 + \frac{2(-l_f C_f + l_r C_r)}{mV_x^2} \\ \frac{2}{I_z}(-l_f C_f + l_r C_r) & \frac{-2}{I_z V_x}(l_f^2 C_f + l_r^2 C_r) \end{bmatrix}$$

$$\left\{\begin{matrix}\beta\\r\end{matrix}\right\} + \begin{bmatrix} 2\frac{C_f}{mV_x} & 2\frac{C_r}{mV_x} \\ 2\frac{l_f C_f}{I_z} & -2\frac{l_r C_r}{I_z} \end{bmatrix}\begin{bmatrix}1 & k_f\\0 & k_r\end{bmatrix}\left\{\begin{matrix}\delta_f\\A_y\end{matrix}\right\}.$$

Figure 5:
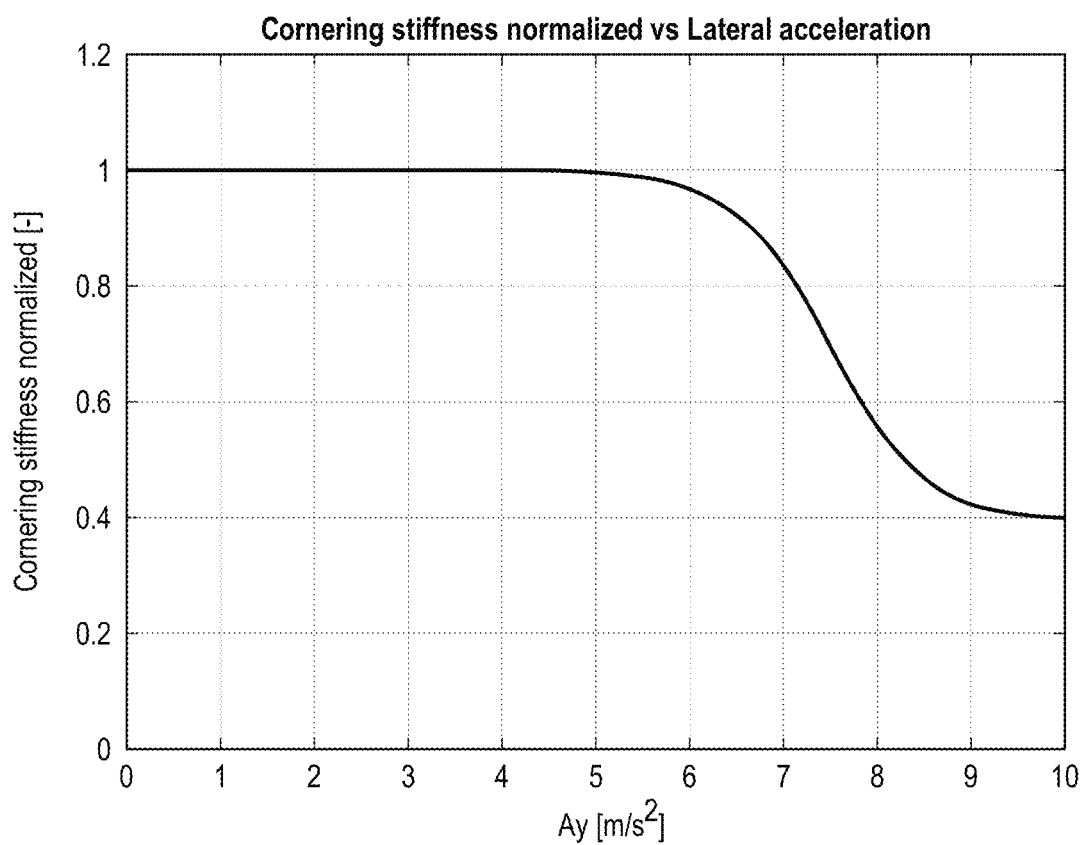
FIG. 5 depicts an example of normalized cornering stiffness as a function of lateral acceleration.

The front and rear cornering stiffness can be expressed as the product of nominal stiffness and a variation of the sigmoid function:

Cornering stiffness = nominal stiffness · variation of sigmoid $$= C_0\left[\frac{c}{1 + e^{b(x-a)}} + 1 - c\right]$$

$$C_f = C_{f0}\left[\frac{c}{1 + e^{b(x-a)}} + 1 - c\right]$$

$$C_r = C_{r0}\left[\frac{c}{1 + e^{b(x-a)}} + 1 - c\right]$$

where x is lateral acceleration in [m/s²]; $C_{f0}$ and $C_{r0}$ are known nominal cornering stiffness (in Newton-meters per radian [Nm/rad]) at the front and rear wheels; and a, b, c, $k_f$, and $k_r$ are parameters to be determined by optimization with the following constraints:

$$7 \leq a \leq 8$$

$$0 < b \approx 2$$

$$0 < c < 1$$

$$|k_f|, |k_r| << 1$$

a is the parameter of translation in the x-axis, which indicates the range of the linear cornering stiffness. b is the parameter of compression or expansion of the stiffness shape in the x-axis. c is the parameter of compression or expansion of the stiffness shape in the y-axis. $k_f$ and $k_r$ are parameters that account for the effects of roll and compliance steer. An example of normalized cornering stiffness as a function of lateral acceleration is depicted in FIG. 5.

Optimization

An optimization-based procedure is used to identify the unknown parameters at the proposed vehicle dynamic model. To find the optimal parameters, a cost function is minimized:

$$J(a, b, c, k_f, k_r) = \sum_{k=1}^{N}\left((\omega_k - \omega(a, b, c, k_f, k_r))^2 + (\beta_k - \beta(a, b, c, k_f, k_r))^2\right)$$

where $\omega_k$ and $\beta_k$ are the kth sample of the yaw rate and side-slip angle, respectively; and $\omega$ and $\beta$ are calculated from the enhanced linear dynamic bicycle model. This optimization can be also carried on the set of yaw rate and lateral acceleration ($A_y$):

$$J(a, b, c, k_f, k_r) =$$

$$\sum_{k=1}^{N}\left((\omega_k - \omega(a, b, c, k_f, k_r))^2 + \left(A_{y_k} - A_y(a, b, c, k_f, k_r)\right)^2\right).$$

Figure 6:
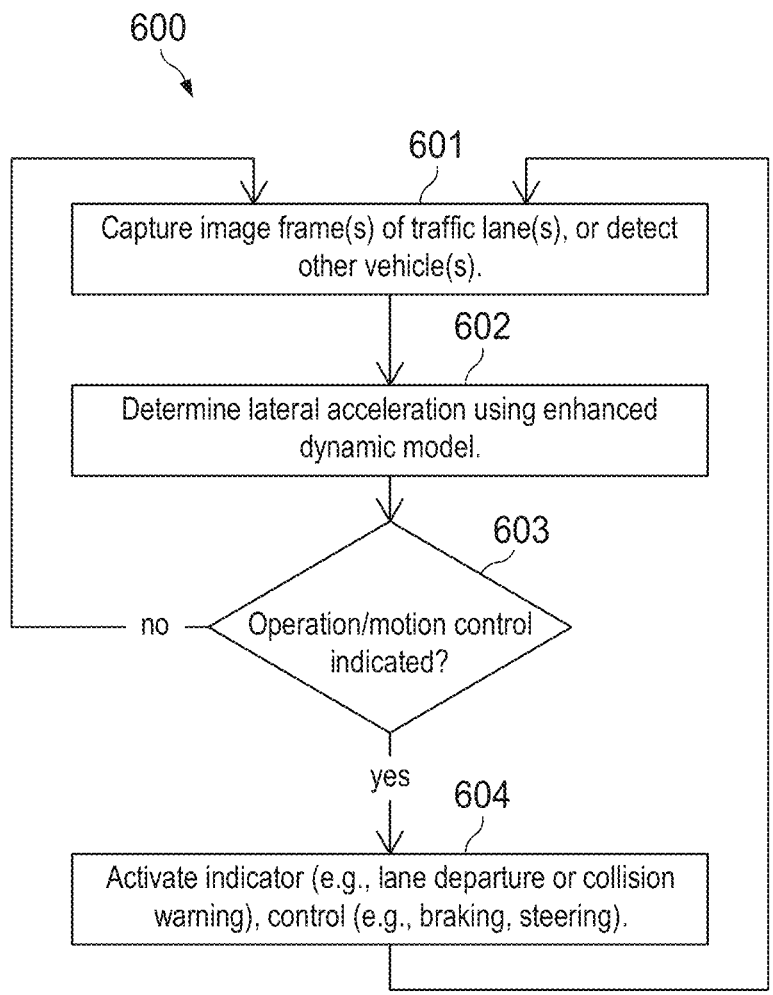
FIG. 6 illustrates a high level flow diagram for a process of operation or motion control based on an enhanced vehicle dynamic model in accordance with embodiments of the present disclosure.

FIG. 6 illustrates a high level flow diagram for a process of operation or motion control based on an enhanced vehicle dynamic model in accordance with embodiments of the present disclosure. The embodiment of the process 600 illustrated in FIG. 6 is for illustration and explanation only. FIG. 6 does not limit the scope of this disclosure to any particular implementation. In some embodiments, the process 600 in FIG. 6 may be implemented using, or by connection to, either or both of the front/side cameras 106, 107 and/or the radar transceiver 120 in FIG. 1, and either or both of the IPM CAN 211, front camera ECU 216, side camera ECU(s) 217, and rear camera ECU 218 and/or the radar CAN 220 and radar ECU 221 in FIG. 2, including the functional (CAN) ECU 251, CAN processor/controller 252, and CAN transceiver 253 for IPM CAN 211 or radar CAN 220 depicted in FIG. 2A. The process 600 may be implemented using the functions depicted in FIG. 3.

The example process 600 illustrated in FIG. 6 includes capturing at least one image frame for traffic lane(s) in front and/or to the sides of the vehicle using at least one camera, and/or detecting surrounding ("target") vehicles using either or both of the at least one camera or the radar transceiver mounted on the vehicle (step 601). This may involve capturing images using a front camera and one or both side cameras and "stitching" those images together to form a panoramic field of view encompassing up to 180°. This may also involve detecting lane boundaries for the occupied lane and/or detecting other vehicles, including motion of the subject ("ego") vehicle relative to the occupied lane and/or the other vehicles.

Based on the vehicle, lane and target vehicle information, lateral acceleration of the vehicle for specific ADAS/AD features is determined using the enhanced vehicle dynamic model described herein (step 602). A check is then made (step 603) of whether some operation or motion control is indicated by the determined lateral acceleration. If not, another iteration of the process is started. If so, an indicator and/or a vehicle control is activated (step 604), and another iteration of the process is started. Activating an indicator may involve activating a lane departure warning indicator or a collision warning indicator. Activating a vehicle control may involve activating a steering control and generating and/or receiving a steering angle control signal for at least one of the front steering angle or the rear steering angle based on activation of the steering control, and/or activating a braking control and generating or receiving a braking control signal for actuating brakes on one or more of the wheels based on activation of the braking control.

The enhanced vehicle dynamic model of the present disclosure is a far simpler form of improving the fidelity of the bicycle model to high performance maneuvers, derived from the intuition of underlying multi dynamics by suggesting that the cornering stiffness function (versus lateral acceleration) shape be varied by a sigmoid function, and the effect of roll/compliance steer at both front and rear steer angle be accounted for by adding a lateral acceleration term. Optimization with vehicle test data provides the optimal set of parameters without spending much time on tuning parameters and with acceptable increase in complexity.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus, comprising:
a transceiver configured to receive signals from a controller area network (CAN) bus coupled to at least one device configured to capture motion information for at least one motion by an ego vehicle; and
an operation and motion controller configured to:
process the motion information relating to the at least one motion by the ego vehicle to determine lateral acceleration for the ego vehicle using a dynamic vehicle model, the dynamic vehicle model including a tire cornering stiffness adapted as a function of the determined lateral acceleration of the ego vehicle, and
activate a steering control with a braking or acceleration control based on the determined lateral acceleration of the ego vehicle,
wherein the tire cornering stiffness as the function of the determined lateral acceleration of the ego vehicle is a sigmoid function.

2. The apparatus according to claim 1, wherein the tire cornering stiffness is determined from:

$$\begin{Bmatrix} \dot{\beta} \\ \dot{r} \end{Bmatrix} = \begin{bmatrix} \frac{-2}{mV_x}(C_f + C_r) & -1 + \frac{2(-l_f C_f + l_r C_r)}{mV_x^2} \\ \frac{2}{I_z}(-l_f C_f + l_r C_r) & \frac{-2}{I_z V_x}(l_f^2 C_f + l_r^2 C_r) \end{bmatrix}$$

$$\begin{Bmatrix} \beta \\ r \end{Bmatrix} + \begin{bmatrix} 2\frac{C_f}{mV_x} & 2\frac{C_r}{mV_x} \\ 2\frac{l_f C_f}{I_z} & -2\frac{l_r C_r}{I_z} \end{bmatrix} \begin{bmatrix} 1 & k_f \\ 0 & k_r \end{bmatrix} \begin{Bmatrix} \delta_f \\ A_y \end{Bmatrix},$$

where $A_y$ is the lateral acceleration of the ego vehicle, $C_f$ and $C_r$ are front and rear tire cornering stiffnesses, respectively, $\beta$ is a side-slip angle of the ego vehicle and $\dot{\beta}$ is a derivative of $\beta$ with respect to time, r is a velocity of the ego vehicle in a yaw direction and $\dot{r}$ is a derivative of r with respect to time, $V_x$ is a longitudinal component of the ego vehicle's velocity V, $l_f$ and $l_r$ are front and rear wheelbase lengths for the ego vehicle, respectively, m and $I_z$ are translational and rotational mass inertias for the ego vehicle, respectively, $k_r$ are optimization parameters determined by testing of the ego vehicle, and $\delta_f$ is a front steering angle of the ego vehicle.

3. The apparatus according to claim 1, wherein:
the dynamic vehicle model further includes a front steering angle and a rear steering angle adapted as a function of lateral acceleration of the ego vehicle; and
the front steering angle and the rear steering angle each include a term accounting for roll steering and compliance steering.

4. An ego vehicle comprising the apparatus according to claim 1, the ego vehicle further comprising:
a motor configured to drive at least one of front or rear wheels of the ego vehicle;

a chassis supporting axles on which the wheels are mounted, the wheels coupled to a steering mechanism configured to control at least one of a front steering angle or a rear steering angle based on activation of the steering control; and a brake actuator configured to actuate brakes for one or more of the wheels based on activation of the braking or acceleration control.

5. The ego vehicle according to claim 4, wherein the ego vehicle is an electric vehicle and the motor is an electric motor.

6. An apparatus, comprising:

a transceiver configured to receive signals from a controller area network (CAN) bus coupled to at least one device configured to capture motion information for at least one motion by an ego vehicle; and an operation and motion controller configured to:
  process the motion information relating to the at least one motion by the ego vehicle to determine lateral acceleration for the ego vehicle using a dynamic vehicle model, the dynamic vehicle model including a cornering stiffness, a front steering angle, and a rear steering angle adapted as a function of the determined lateral acceleration of the ego vehicle, and
  activate a steering control with a braking or acceleration control based on the determined lateral acceleration of the ego vehicle, wherein the cornering stiffness is adapted by a sigmoid function of the determined lateral acceleration of the ego vehicle, wherein the front steering angle and the rear steering angle each include a term accounting for roll steering and compliance steering, and wherein the front steering angle $\delta_f$ is given by:

$$\delta_f = \delta_{f,kinematic} + k_f a_y,$$

where $\delta_{f,kinematic}$ corresponds to kinematic steering of front wheels of the ego vehicle, $a_y$ is the lateral acceleration of the ego vehicle, and $k_f$ is an optimization parameter determined by testing of a design for the ego vehicle.

7. The apparatus according to claim 6, wherein $k_f a_y$ accounts for roll steering and compliance steering of the front wheels of the ego vehicle.

8. The apparatus according to claim 6, wherein the rear steering angle $\delta_r$ is given by:

$$\delta_r = k_r a_y,$$

where $k_r$ is another optimization parameter determined by testing of the design for the ego vehicle.

9. The apparatus according to claim 8, wherein $k_r a_y$ accounts for roll steering and compliance steering of rear wheels of the ego vehicle.

10. The apparatus according to claim 6, wherein the cornering stiffness is determined from:

$$\{\dot{\beta} \atop \dot{r}\} = \begin{bmatrix} \frac{-2}{mV_x}(C_f+C_r) & -1+\frac{2(-l_fC_f+l_rC_r)}{mV_x^2} \\ \frac{2}{I_z}(-l_fC_f+l_rC_r) & \frac{-2}{I_zV_x}(l_f^2C_f+l_r^2C_r) \end{bmatrix}$$

$$\{\beta \atop r\} + \begin{bmatrix} 2\frac{C_f}{mV_x} & 2\frac{C_r}{mV_x} \\ 2\frac{l_fC_f}{I_z} & -2\frac{l_rC_r}{I_z} \end{bmatrix} \begin{bmatrix} 1 & k_f \\ 0 & k_r \end{bmatrix} \{\delta_f \atop A_y\},$$

where $C_f$ and $C_r$ are front and rear tire cornering stiffnesses, respectively, $\beta$ is a side-slip angle of the ego vehicle and $\dot{\beta}$ is a derivative of $\beta$ with respect to time, r is a velocity of the ego vehicle in a yaw direction and $\dot{r}$ is a derivative of r with respect to time, $V_x$ is a longitudinal component of the ego vehicle's velocity V, $l_f$ and $l_r$ are front and rear wheelbase lengths for the ego vehicle, respectively, m and $I_z$ are translational and rotational mass inertias for the ego vehicle, respectively, $k_r$ are optimization parameters determined by testing of the ego vehicle, and $\delta_f$ is the front steering angle of the ego vehicle.

11. The apparatus according to claim 6, further comprising:

a motor configured to drive at least one of front or rear wheels of the ego vehicle;

a chassis supporting axles on which the wheels are mounted, the wheels coupled to a steering mechanism configured to control at least one of the front steering angle or the rear steering angle based on activation of the steering control; and a brake actuator configured to actuate brakes for one or more of the wheels based on activation of the braking or acceleration control.

12. A method, comprising:

receiving signals from a controller area network (CAN) bus coupled to at least one device configured to capture motion information for at least one motion by an ego vehicle;

processing the motion information relating to the at least one motion by the ego vehicle to determine lateral acceleration for the ego vehicle using a dynamic vehicle model, the dynamic vehicle model including tire cornering stiffness adapted as a function of the determined lateral acceleration of the ego vehicle; and activating a steering control with a braking or acceleration control based on the determined lateral acceleration of the ego vehicle, wherein the tire cornering stiffness as the function of the determined lateral acceleration of the ego vehicle is a sigmoid function.

13. The method according to claim 12, wherein the tire cornering stiffness is determined from:

$$\{\dot{\beta} \atop \dot{r}\} = \begin{bmatrix} \frac{-2}{mV_x}(C_f+C_r) & -1+\frac{2(-l_fC_f+l_rC_r)}{mV_x^2} \\ \frac{2}{I_z}(-l_fC_f+l_rC_r) & \frac{-2}{I_zV_x}(l_f^2C_f+l_r^2C_r) \end{bmatrix}$$

$$\{\beta \atop r\} + \begin{bmatrix} 2\frac{C_f}{mV_x} & 2\frac{C_r}{mV_x} \\ 2\frac{l_fC_f}{I_z} & -2\frac{l_rC_r}{I_z} \end{bmatrix} \begin{bmatrix} 1 & k_f \\ 0 & k_r \end{bmatrix} \{\delta_f \atop A_y\},$$

where $A_y$ is the lateral acceleration of the ego vehicle, $C_f$ and $C_r$ are front and rear tire cornering stiffnesses, respectively, $\beta$ is a side-slip angle of the ego vehicle and $\dot{\beta}$ is a derivative of $\beta$ with respect to time, r is a velocity of the ego vehicle in a yaw direction and $\dot{r}$ is a derivative of r with respect to time, $V_x$ is a longitudinal component of the ego vehicle's velocity V, $l_f$ and $l_r$ are front and rear wheelbase lengths for the ego vehicle, respectively, m and $I_z$ are translational and rotational mass inertias for the ego vehicle, respectively, $k_r$ are optimization parameters determined by testing of the ego vehicle, and $\delta_f$ is a front steering angle of the ego vehicle.

14. The method according to claim 12, wherein:
the dynamic vehicle model further includes a front steering angle and a rear steering angle adapted as a function of lateral acceleration of the ego vehicle; and
the front steering angle and the rear steering angle each include a term accounting for roll steering and compliance steering.

15. The method according to claim 14, wherein the front steering angle $\delta_f$ is given by:

$$\delta_f = \delta_{f,kinematic} + k_f a_y,$$

where $\delta_{f,kinematic}$ corresponds to kinematic steering of front wheels of the ego vehicle, $a_y$ is the lateral acceleration of the ego vehicle, and $k_f$ is an optimization parameter determined by testing of a design for the ego vehicle.

16. The method according to claim 15, wherein $k_f a_y$ accounts for roll steering and compliance steering of the front wheels of the ego vehicle.

17. The method according to claim 14, wherein the rear steering angle $\delta_r$ is given by:

$$\delta_r = k_r a_y,$$

where $a_y$ is the lateral acceleration of the ego vehicle, and $k_r$ is an optimization parameter determined by testing of a design for the ego vehicle.

18. The method according to claim 17, wherein $k_r a_y$ accounts for roll steering and compliance steering of rear wheels of the ego vehicle.

19. The method according to claim 12, further comprising:
driving at least one of front or rear wheels of the ego vehicle with a motor;
supporting axles on which the wheels are mounted on a chassis, the wheels coupled to a steering mechanism configured to control at least one of the front steering angle or the rear steering angle based on activation of the steering control; and
actuating brakes for one or more of the wheels based on activation of the braking or acceleration control.

20. The method according to claim 19, wherein the ego vehicle is an electric vehicle and the motor is an electric motor.

* * * * *